US012788047B2

(12) United States Patent
Benesh et al.

(10) Patent No.: US 12,788,047 B2
(45) Date of Patent: Nov. 10, 2026

(54) SNACK BAR

(71) Applicant: Torr Bar Ltd., Zichron Yaacov (IL)

(72) Inventors: Yoel Benesh, Kokhav Ya'ir (IL); Gil De Picciotto, Zikhron Yaakov (IL)

(73) Assignee: Torr Bar Ltd., Zichron Yaacov (IL)

( * ) Notice: Subject to any disclaimer, the term of this patent is extended or adjusted under 35 U.S.C. 154(b) by 964 days.

(21) Appl. No.: 17/642,989

(22) PCT Filed: Sep. 30, 2020

(86) PCT No.: PCT/IL2020/051066

§ 371 (c)(1),
(2) Date: Mar. 15, 2022

(87) PCT Pub. No.: WO2021/064728

PCT Pub. Date: Apr. 8, 2021

(65) Prior Publication Data

US 2022/0338525 A1 Oct. 27, 2022

Related U.S. Application Data

(60) Provisional application No. 62/910,473, filed on Oct. 4, 2019.

(51) Int. Cl.

| | |
|---|---|
| ***A23P 30/00*** | (2016.01) |
| ***A23L 5/30*** | (2016.01) |
| ***A23L 7/126*** | (2016.01) |

(52) U.S. Cl.

CPC ................. *A23P 30/00* (2016.08); *A23L 5/32* (2016.08); *A23L 7/126* (2016.08); *A23V 2002/00* (2013.01)

(58) Field of Classification Search

CPC .......... A23P 10/00; A23P 10/20; A23P 10/25; A23P 30/00; A23P 30/10; A23L 7/126;

(Continued)

(56) References Cited

U.S. PATENT DOCUMENTS

| | | | |
|---|---|---|---|
| 1,663,719 | A | 3/1928 | Morley |
| 1,813,099 | A | 7/1931 | Story |

(Continued)

FOREIGN PATENT DOCUMENTS

| | | |
|---|---|---|
| DE | 2433650 | 1/1976 |
| EP | 0178074 | 4/1986 |

(Continued)

OTHER PUBLICATIONS

Supplementary European Search Report and the European Search Opinion Dated Sep. 25, 2023 From the European Patent Office Re. Application No. 20873241.2. (7 Pages).

(Continued)

*Primary Examiner* — Viren A Thakur
*Assistant Examiner* — Austin Parker Taylor

(57) ABSTRACT

Provided herein is a snack bar containing essentially identifiable uncooked and ready-to-eat foodstuff while being substantially devoid of an added binder, such as carbohydrate-based binder. Also provided is a process of preparing the binder-free snack bar, using compression and ultrasonic energy without cooking the foodstuff, while achieving a chemically and mechanically stable ready-to-eat product.

14 Claims, 8 Drawing Sheets

(58) Field of Classification Search

CPC .......... A23L 13/52; A23L 17/10; A23L 17/70; A23L 17/75; B30B 1/00; B30B 11/02; B30B 11/022; B30B 11/04; B30B 15/02; B30B 15/022; B30B 15/06; B30B 15/062; B30B 15/065

USPC ........ 426/238, 454; 425/352, 406, 412, 421, 425/432, 456

See application file for complete search history.

(56) References Cited

U.S. PATENT DOCUMENTS 1,890,697 A 12/1932 Scanlan
1,924,826 A 8/1933 Anderson
2,092,160 A 9/1937 Hawerlander
2,190,949 A 2/1940 Plews
2,310,463 A 2/1943 Russel
2,437,150 A 3/1948 Berg et al.
3,385,715 A 5/1968 Ishler et al.
3,821,443 A 6/1974 Halladay et al.
3,840,685 A 10/1974 Lyalll et al.
3,903,308 A 9/1975 Ode
3,917,861 A * 11/1975 Viera ...................... A23P 20/20 426/454
4,038,423 A 7/1977 Hawward et al.
4,055,669 A 10/1977 Kelly et al.
4,096,283 A * 6/1978 Rahman ................. A23B 4/037 426/640
4,394,395 A 7/1983 Rostagno et al.
4,759,940 A 7/1988 Cattaneo et al.
4,880,645 A 11/1989 Carpenter et al.
5,026,689 A 6/1991 Ringe et al.
5,091,201 A 2/1992 Murata et al.
5,128,163 A 7/1992 Theys et al.
5,250,308 A 10/1993 Alexander et al.
5,273,771 A 12/1993 Rapaille et al.
5,275,830 A 1/1994 Smith
5,413,805 A 5/1995 Delpierre, III et al.
5,612,074 A 3/1997 Leach
5,709,902 A 1/1998 Bartolomei et al.
5,804,235 A 9/1998 Altschul
5,827,564 A 10/1998 Bodkin, Sr.
5,846,584 A * 12/1998 Capodieci ................. A23L 5/32 426/512
5,855,706 A * 1/1999 Grewell .............. B29C 65/7841 156/359
5,861,185 A 1/1999 Capodieci
5,871,793 A 2/1999 Capodieci
5,914,140 A 6/1999 Kamper et al.
5,919,503 A 7/1999 Leusner
5,935,613 A 8/1999 Benham et al.
6,048,555 A 4/2000 Kamper et al.
6,068,868 A 5/2000 Capodieci
6,132,199 A 10/2000 Chierici et al.
6,149,965 A 11/2000 Van Lengerich et al.
6,231,330 B1 5/2001 Capodieci
6,242,033 B1 6/2001 Sander
6,248,379 B1 6/2001 Capodieci et al.
6,318,248 B1 11/2001 Capodieci
6,368,647 B1 4/2002 Capodieci
6,431,849 B1 8/2002 Capodieci
6,432,460 B1 8/2002 Zietlow et al.
6,517,879 B2 2/2003 Capodieci
6,607,765 B2 8/2003 Capodieci
6,655,948 B2 12/2003 Capodieci
6,685,976 B2 2/2004 Hansa et al.
6,720,015 B2 4/2004 Prosise et al.
6,783,784 B2 8/2004 Skene et al.
6,793,953 B2 9/2004 Zietlow et al.
7,037,551 B2 5/2006 Moore et al.
7,097,870 B2 8/2006 Funk et al.
7,169,422 B2 1/2007 Mesu et al.
7,431,955 B2 10/2008 Froseth et al.
7,901,725 B2 3/2011 Johnson et al.
7,964,233 B2 6/2011 Karwowki et al.
8,257,773 B2 9/2012 Froseth et al.
8,268,374 B2 9/2012 Capodieci
8,541,044 B1 9/2013 Johnson et al.
8,709,517 B2 4/2014 Capodieci
2002/0017197 A1* 2/2002 Capodieci ............... A23P 30/36 99/323.4
2002/0127310 A1 9/2002 Capodieci
2003/0041743 A1 3/2003 Capodieci
2003/0134010 A1 7/2003 Krysiak et al.
2003/0185961 A1 10/2003 Sault et al.
2003/0207001 A1 11/2003 Skene et al.
2004/0022901 A1 2/2004 Funk
2005/0214420 A1* 9/2005 Schmidt ................ A23L 33/135 426/512
2009/0162498 A1 6/2009 McArdle et al.
2010/0005981 A1* 1/2010 Patrikios ................... F16P 3/00 100/341
2010/0040745 A1 2/2010 Capodieci
2010/0159086 A1 6/2010 Diolaiti
2010/0183772 A1 7/2010 Clanton et al.
2011/0039004 A1 2/2011 Garter
2011/0143011 A1 6/2011 Meissner
2011/0151065 A1* 6/2011 Bartkowska ............ A23P 20/20 426/282
2012/0315359 A1 12/2012 Gandhi et al.
2013/0084360 A1* 4/2013 Capodieci ............... A23L 13/67 426/238
2016/0015073 A1 1/2016 Belliveau et al.
2016/0050959 A1 2/2016 Vallini et al.
2017/0251686 A1* 9/2017 Chaurin .................. A23P 10/28
2018/0368452 A1 12/2018 Shoop et al.
2020/0178554 A1* 6/2020 Jung ....................... B65B 63/02

FOREIGN PATENT DOCUMENTS

EP 1262111 12/2002
EP 0325479 9/2020
FR 2884392 A1 * 10/2006 ............. A23C 9/156
GB 588354 5/1947
RU 2591458 C2 * 7/2016
WO WO 2006/121724 11/2006
WO WO 2008/028112 3/2008
WO WO 2010/127912 11/2010
WO WO 2011/148006 12/2011
WO WO-2018174566 A1 * 9/2018 ............. B28B 11/04
WO WO 2007/081637 7/2020
WO WO 2021/064728 4/2021

OTHER PUBLICATIONS

International Preliminary Report on Patentability Dated Apr. 14, 2022 From the International Bureau of WIPO Re. Application No. PCT/IL2020/051066. (10 Pages).

International Search Report and the Written Opinion Dated Mar. 30, 2021 From the International Searching Authority Re. Application No. PCT/IL2020/051066. (11 Pages).

* cited by examiner

SNACK BAR

RELATED APPLICATIONS

This application is a National Phase of PCT Patent Application No. PCT/IL2020/051066 having International filing date of Sep. 30, 2020, which claims the benefit of priority under 35 USC § 119(e) of U.S. Provisional Patent Application No. 62/910,473 filed on Oct. 4, 2019. The contents of the above applications are all incorporated by reference as if fully set forth herein in their entirety.

FIELD AND BACKGROUND OF THE INVENTION

The present invention, in some embodiments thereof, relates to food products and more particularly, but not exclusively, to a binder-free snack bar and method of preparing the same.

Nowadays food consumption is trending towards a more heathy diet containing minimal processed food ingredients. Food transparency trends relates to consumer demand for clearly—understand what it is that they are eating. Another trend is replacing traditional meals with snacking, preferably healthy snacking. These trends are expressed in the emergence of transparent packaging, identifiable ingredients and on-the-go ready-to-eat food products. However, snack bars that try to cater to these trends, use sugar-based or otherwise processed carbohydrate binders to hold the structure together, whereas the use of sugars in processed food items negates the trend for healthy eating.

Ready to eat (RTE) food products such as granola bars, clusters and snacks, comprising grain and cereal, nuts, dried fruit and/or seeds, and sweetener binder, are considered a healthy nutritional choice for people on the move. In the presently known snack-food products, such as granola bars, the two basic ingredients are a binder which is typically a sugar solution and dried components such as nuts, dried fruit and/or cereal products. These ingredients are thoroughly mixed and then formed into large sheets which are transferred into a drying/baking oven. Whilst passing through or in the drying/baking oven, moisture is removed from the sugar solution binder and also from the components of the snack-food product, resulting in a sheet of dried and/or baked, adhered components which can then be removed from the oven and cut into the desired sizes and shapes of the snack-food product. Such a method is described, for example, in U.S. Pat. No. 7,169,422, which is incorporated herein by reference in its entirety.

In the known method, the step of drying and baking the sheet of adhered components in the drying/baking oven is particularly time-consuming and typically is the rate-limiting step in the process that holds up the whole of the rest of the production line. The drying step also requires significant amounts of energy to dry the adhered components. Furthermore, drying the components also requires an enormous amount of capital expenses, such as equipment, materials and space. U.S. Pat. No. 8,541,044, which is incorporated herein by reference in its entirety, provides novel no-bake grain products and methods of preparation of the same, wherein a no-bake food product is afforded with a toasted appearance and flavor. Also provided is a method of affording a toasted appearance and flavor to a no-bake food product, whereas the no-bake food product includes granola bars, clusters, cereal, instant hot cereal and snacks.

Food binders, such as those useful to bind particulates so as to form a granola bar, or those useful to bind particulates to form a RTE cereal cluster, are often based on a sugar syrup, making water activity control relatively easy. The water activity of the food binder syrups used to form granola bars preferably have a water activity of less than 0.55. Sucrose, corn syrup, dextrose, and other sugars are often combined with water to provide a binder syrup having a desirable taste and mouthfeel. The sucrose, corn syrup, dextrose, and other sugars are known to bind free water so that the water in the syrup does not migrate to the particulates; however, sugary binders are generally hygroscopic. In the case of snack bars and other crisp particulates in an agglomerated product, moisture migration from the syrup to the particulates is unacceptable in that the particulate may become soggy, stale, and easily compacted and/or crumbled. In addition, the binders contribute significantly to the caloric intake of the consumer that is based primarily on processed sugars and other ingredients that are purposely avoided by heath-aware consumers.

Baking, extrusion and the use of a sheeting line are some of the more prevalent methodologies used today to achieve a specific form or shape in bar-type food products. If one looks at the bar segment, one may find bars that are made of fruit puree, such as pressed dated, that make the shape of the bar and may, or may not, have inclusions such as fruits, seeds or nuts. Said seeds, nuts and fruit are hardly identifiable due the fact that they are entrapped in the fruit puree. Another known method of producing the shape of the bar is baking, where foods, usually cereals, are mixed together with a carbohydrate binder, shaped into the desired shape and baked to produce a shelf stable product. Another technique is to mix various foodstuff with a hot sugary binder, form a sheet of specific measures, cool said sheet and cut said sheet to desired dimension and shape. In all of the above described methods there is use of a sugary/carbohydrate binder, fruit or starch which is material to hold the structure, and in some technologies the individual components cannot be visually identified.

U.S. Pat. No. 3,385,715 teaches a process in which morsels of a freeze-dried cellular food are rehydrated to a moisture content of about to 13%, compressed together with added gum while maintaining the surface moisture of the morsels and the pressure sufficiently high to cause the morsels to adhere during the compression, and dehydrated by heat to a moisture content below about 3%, the degree of compression being such that the density of the dehydrated product is in the range of about 0.5 to 0.9 gram per cc.

U.S. Pat. No. 6,132,199 teaches an apparatus that compresses cereal flakes by means of several successive pressure steps. U.S. Pat. No. 5,128,163 teaches a process to prepare high water activity foodstuff, such as onion rings, without binder, by way of chilling a comminuted mass of food to sub-freezing temperatures, prior to low pressure molding. EP1262111 teaches a method to build an apparatus that presses cereal that contain a syrup or a binder. U.S. Pat. No. 2,437,150 teaches a method of preparing a compressed cereal bar with a binder made of glycerin of propylene glycol. GB588354 discloses a method of compressing powder, flakes or powder foodstuff, by lowering temperature below due point prior to pressing the food. U.S. Pat. No. 4,394,395 teaches the forming of a bar made of powdered food, by way of sintering in a furnace. U.S. Pat. No. 4,759,940 teaches a method of producing a milk powder tablet by adding sugar as a binder and pressing until a tablet is formed. DE2433650 teaches a process of preparing a food bar by compressing milled and granulated foodstuff. U.S. Pat. No. 6,517,879 to Capodieci discloses a method for manufacturing puffed cereal product cereal, where in embodiments, cereals are compressed prior to puffin said cereals using ultrasonic activation. U.S. Pat. No. 8,709,517 to Capodieci discloses a method for manufacturing a snack food with from a non-cohesive homogeneous blend of ingredients using an ultrasonic horn and an anvil to form an agglomerated, cohesive and portable snack without the use of additives, including but not limited to preservatives, plasticizers, binders and fluidizers. Additional patents to Capodieci include U.S. Pat. Nos. 5,861,185, 5,871,793, 6,068,868, 6,231,330, 6,248,379, 6,318,248, 6,368,647, 6,431,849, 6,517,879, 6,607,765 and 6,783,784.

Additional background art includes U.S. Pat. Nos. 1,663,719, 1,813,099, 1,890,697, 1,924,826, 2,092,160, 2,190,949, 2,310,463, 3,821,443, 3,840,685, 3,903,308, 3,917,861, 4,038,423, 4,055,669, 4,880,645, 5,026,689, 5,091,201, 5,250,308, 5,273,771, 5,275,830, 5,413,805, 5,612,074, 5,709,902, 5,804,235, 5,827,564, 5,919,503, 5,935,613, 6,048,555, 6,149,965, 6,242,033, 6,432,460, 6,685,976, 6,720,015, 6,793,953, 7,037,551, 7,097,870, 7,169,422, 7,431,955, 7,901,725, 7,964,233 and 8,257,773, U.S. Patent Application Publication Nos. 2003/0134010, 2003/0185961, 2004/0022901, 2009/0162498, 2010/0183772, 2011/0039004, 2011/0143011, 2012/0315359 and 2016/050959, International Patent Application Publication Nos. WO2006121724, WO2007081637, WO2008028112 and WO2011148006, and EP0178074, EP2427063 and EP0325479.

SUMMARY OF THE INVENTION

Aspects of the present invention are drawn to a ready-to-eat food product, belonging to any one of the categories of health snacks, breakfast snacks, energy snacks and the likes, which are typically sold in the form of a bar; the uniqueness thereof is in the way the foodstuff ingredients are held together into a unified object, essentially without an added binder. The snack bars provided herein are produced by mechanically compressing a mixture of foodstuff ingredients, and thereafter applying sonic energy thereto, causing the foodstuff ingredients to fuse or be welded to one-another, thereby forming the snack bar.

Thus, there is provided a process of preparing a snack bar, the process includes:

applying a first compression force ($F_1$) to a loose mixture of foodstuff ingredients to thereby obtain a compressed mixture;

applying a second compression force ($F_2$) while applying sonic energy to the compressed mixture, thereby obtaining the snack bar;

wherein the first compression force is greater than the second compression force ($F_1>F_2$).

In some embodiments, the loose mixture of foodstuff ingredients is characterized by a welding water activity that ranges 0.55 to 0.65.

In some embodiments, the first compression force is less than an oil-pressing force, the oil-pressing force is determined by pressing the mixture at an increasingly growing force and recording the oil-pressing force at an unacceptable oil extraction.

In some embodiments, the first compression force is less than an over-hardening force, the over-hardening force is determined by pressing the mixture at an increasingly growing force and recording the over-hardening force at an unacceptable hardening.

In some embodiments, the second compression force and the sonic energy are applied essentially simultaneously by an ultrasonic horn.

In some embodiments, the second compression force is less than a sonic energy damping force, the sonic energy damping force is determined by pressing the compressed mixture using the ultrasonic horn at an increasingly growing force and recording the sonic energy damping force.

In some embodiments, the second compression force is applied so as not to dampen the sonic energy. Preferably, $F_2$ is applied at a force that does not dampen the sonic energy transmitted into the compressed mixture by more than 5%, 10%, 20%, 30%, 40% or more than 50%.

In some embodiments, the sonic energy ranges from 1 watts per cm2 to 100 watts per $cm^2$.

In some embodiments, the second compression force is applied gradually or stepwise from 3 $N/cm^2$ to the sonic energy damping force or less.

In some embodiments, the welding ($F_2$ plus US) is effected for 0.5 sec to 10 sec.

In some embodiments, the process presented herein is effected in a single face open mold.

In some embodiments, the compressed mixture has an area of 10-300 $cm^2$ and a height of 0.5-5 cm.

In some embodiments, the pre-process nutritional value and/or the pre-process water content the mixture is substantially similar to the post-process nutritional value and/or the post-process water content of the snack bar.

In some embodiments, the snack bar is substantially devoid of an added binder.

In some embodiments, the snack bar is binder-free as determined by a binder-dissolution assay.

In some embodiments, the snack bar is characterized by increasing a Brix percentage of distilled water by less than 2 Brix % during the binder-dissolution assay.

In some embodiments, the foodstuff ingredients are each selected from the group consisting of a nut, a cereal, a seed, a fruit, a vegetable, a dry meat, a dry dairy product, a dry confectionary product, and any combination thereof.

In some embodiments, the mixture that includes at least 20 wt % dry foodstuff ingredients, the dry foodstuff ingredients comprise less than 10 wt % water.

In some embodiments, the foodstuff ingredients are uncooked.

In some embodiments, the foodstuff ingredients are in a form of whole and/or pieces, and a combination thereof.

In some embodiments, the snack bar includes a mixture of foodstuff ingredients essentially as presented in Tables 1-14 and 16, and Recipe A and B, hereinbelow.

According to another aspect of embodiments of the present invention, there is provided a snack bar, essentially obtained by the process presented herein.

In some embodiments, the snack bar is having an area of 10-300 $cm^2$ and a height of 0.5-5 cm.

In some embodiments, the snack bar is characterized by a post-process nutritional value and/or a post-process water content that is substantially similar to a pre-process nutritional value and/or a pre-process water content of the mixture of foodstuff ingredients that includes the same.

In some embodiments, the snack bar is substantially devoid of an added binder.

In some embodiments, the snack bar is binder-free as determined by a binder-dissolution assay.

In some embodiments, the snack bar is characterized by increasing a Brix percentage of distilled water by less than 2 Brix % during a binder-dissolution assay.

In some embodiments, the snack bar includes foodstuff ingredients selected from the group consisting of a nut, a cereal, a seed, a fruit, a vegetable, a dry meat, a dry dairy product, a dry confectionary product, and any combination thereof.

In some embodiments, the snack bar is manufactured from a loose mixture of ingredients that that includes at least 20 wt % dry foodstuff ingredients, the dry foodstuff ingredients comprise less than 10 wt % water.

In some embodiments, the snack bar is manufactured from foodstuff ingredients that are essentially uncooked.

In some embodiments, the snack bar is manufactured from foodstuff ingredients that are essentially in a form of whole and/or pieces, and a combination thereof.

In some embodiments, the snack bar is manufactured from a loose mixture of foodstuff ingredients essentially as presented in Tables 1-14 and 16, and Recipe A and B, hereinbelow.

According to another aspect of some embodiments of the present invention there is provided a snack bar, that includes ready-to-eat identifiable foodstuff ingredients fused into an edible object by mechanical pressure and sonic energy, wherein the snack bar is characterized by exhibiting an original water activity (measured by any standard and industry-acceptable water activity test) and an original fracture stress (measured by any standard and industry-acceptable test, such as a three-points bending test) recorded for a size unit of the snack bar, according to some embodiments of the present invention, and further characterized by exhibiting at least 10% of the original fracture stress after the size unit thereof is immersed under non-contact stirring in a volume unit of distilled water that is kept at about 60° C. for 5 minutes, and dried to the original water activity (original dryness).

According to some embodiments of the present invention, the snack bar is characterized by exhibiting at least 10% higher fracture stress (measured in a standard and industry acceptable assay), compared to a fracture stress measured in a comparable bar prepared without sonic energy that includes the same foodstuff and an added binder, after a size unit of the snack bar and of the comparable bar are each immersed under non-contact stirring in a volume unit of distilled water kept at about 60° C. for 5 minutes, without drying.

According to some embodiments of the present invention, the snack bar is characterized by an original water activity and further by losing less than 10% of its original mass after being submersed under non-contact stirring in a volume unit of distilled water kept at about 60° C. for 2-5 minutes followed by re-drying the sample to the original water activity.

According to some embodiments of the present invention, the snack bar is characterized by increasing a Brix percentage of distilled water by less than 2 Brix % after submersion under non-contact stirring for 2 minutes of a size unit thereof in a volume unit of the distilled water kept at 60° C.

According to some embodiments of the present invention, the snack bar is substantially devoid of an added water-soluble binder.

According to some embodiments of the present invention, the foodstuff ingredients that includes essentially dried ingredients selected from the group consisting of a nut, a cereal, a seed, a fruit, a vegetable, dry meat, and any combination thereof.

According to some embodiments of the present invention, the foodstuff ingredients are uncooked.

According to some embodiments of the present invention, the foodstuff ingredients are in a form of whole and/or individually-visible pieces, and a combination thereof.

According to some embodiments of the present invention, the nutritional value of the combined foodstuff ingredients prior to the formation of the snack bar, is substantially the same as the nutritional value of the snack bar after its preparation. In other words, the pressure and sonication does not alter the nutritional value, the foodstuff is not cooked during the process of preparing the snack bar, and the ingredients do not lose oil or other elements thereof.

According to some embodiments of the present invention, the snack bar is characterized by a water activity of less than 0.85 water vapor partial pressure, or less than 0.7 water vapor partial pressure.

According to some embodiments of the present invention, the snack bar includes a mixture of foodstuff ingredients essentially as presented in Tables 1-14 hereinbelow.

According to another aspect of some embodiments of the present invention, there is provided a process of preparing the snack bar presented herein; the process is effected by:

providing a mixture of the foodstuff ingredients;

compressing the mixture in a mold; and applying sonic energy in the mold.

According to some embodiments, the process includes adding water to the mixture.

According to some embodiments of the present invention, applying the sonic energy is effected subsequent and/or during the compression of the foodstuff ingredients.

According to some embodiments of the present invention, the process further includes, subsequent to the step of applying sonic energy, drying the snack bar to a desired water activity (desired dryness).

According to some embodiments of the present invention, the process is effected without heating the foodstuff ingredients above 90° C.

According to some embodiments of the present invention, the compression step is effected at a pressure that ranges from 10 to 500 bar.

According to some embodiments of the present invention, the sonic energy is applied at a frequency that ranges from 5 KHz to 100 KHz, and a power that ranges from 1 watts per $cm^2$ to 100 watts per $cm^2$.

According to some embodiments of the present invention, the nutritional value of the mixture of foodstuff ingredients, measured before compressing it and applying sonic energy thereto, is substantially the same as the nutritional value of the snack bar after the compression and sonication.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SOME SPECIFIC EMBODIMENTS OF THE INVENTION

Figure 1:
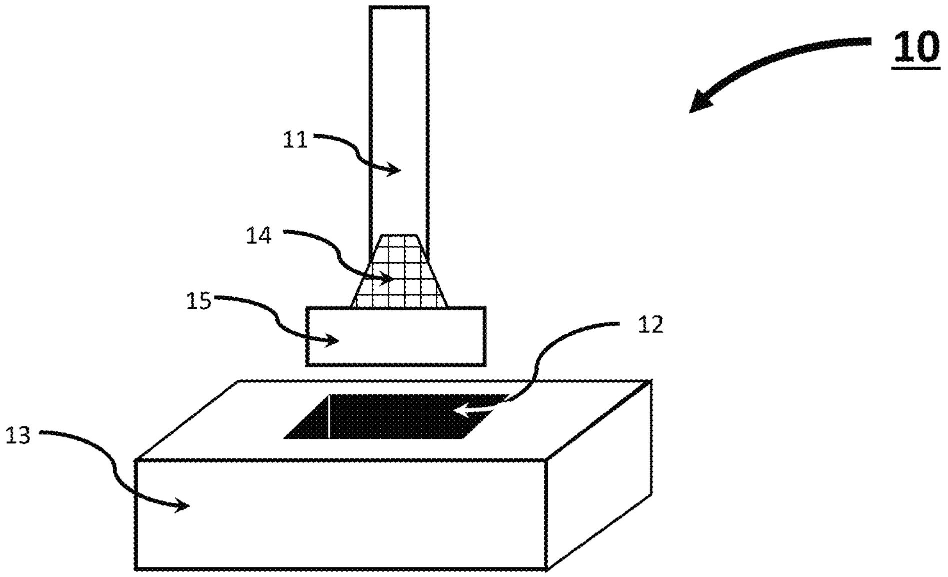
FIG. 1 is a schematic illustration of an exemplary device for preparing a snack bar, according to some embodiments of the present invention, wherein device 10 includes piston 11 for applying pressure on the mixture of foodstuff ingredients placed in chamber 12, which is a bar-shaped depression in anvil 13, and showing sonic energy transducer/generator 14 which is attached to US horn and plunger 15, for applying sonic energy in chamber 12 when US horn and plunger 15 is pressing on the mixture of foodstuff ingredients.

The present invention, in some embodiments thereof, relates to food products and more particularly, but not exclusively, to a binder-free snack bar and method of preparing the same.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

There have been many efforts in the food industry to develop meal substitutes, particularly breakfast substitutes, for consumers who do not have the time or desire to consume a conventional meal. To serve as a convenient meal substitute, a product should be a portable ready-to-eat food product that requires no cooking, no application of additional ingredients, and so forth. Ideally a meal substitute does not require the use of utensils such that it can be eaten in nearly any location at any time, including while driving, riding on a train, walking, and so forth. Some of the most popular meal substitutes are substantially nonperishable hand-to-mouth food products that are packaged in disposable packaging materials. Many such products come in the form of a hand held food bar. However, food bars are not necessarily nutritionally complete, as many food bars lack adequate protein, vitamins, minerals, fiber and so forth, to accurately be considered a "meal substitute", or are processed in such way that some or most of the nutritional value of the ingredients is lost, and/or they include additives and binders that increase the caloric value of the snack, and reduce its nutritional value.

Further, many of these products are difficult to handle, either because they are too dry or too moist. Bars that are too dry fall apart easily, producing unwanted crumbs. Bars that are too moist become excessively sticky and messy. Additionally, the organoleptic properties of many of these bars are quite poor. It is also important that food, particularly meal substitutes, have an appealing appearance so that the entire eating experience is a pleasant one. Many of the meal substitutes on the market today, however, have been processed to such an extent that they bear little or no resemblance to their original state.

Thus, while conceiving the present invention, the inventors have contemplated a snack bar, based on the well-established list of natural ingredients, such as cereal, nuts, dried fruit and/or seeds, which keeps the natural ingredients essentially "as-is" before being incorporated into a bar, in terms of appearance, color, taste and overall nutritional value, without the use of baking, and without the use of sugars, or any other form of a binder. Indeed, a portable RTE food product that has improved nutritional and organoleptic characteristics at least by being binder-free, yet maintains an appealing appearance was afforded using a method for preparation such a snack bar, as demonstrated and exemplified hereinbelow.

A Snack Bar:

According to an aspect of embodiments of the present invention, there is provided a snack bar food product that includes ready-to-eat foodstuff ingredients, and being substantially devoid of a binder.

It is noted that in some embodiments of the present invention, one of more of the ingredients in the presently disclosed snack bar may act as a binder in other application, when dissolved in water to a certain concentration, however, in the context of the present invention, such ingredients do not act as a binder since they are used in smaller amounts with little water, conditions which are not conducive for forming a binder effect. For example, when using dextrin in an exemplary snack bar according to some embodiments of the present invention, e.g., for its nutritional fiber, the amount of dextrin and water used in the mixture cannot afford binding properties to the mixture without effecting the process provided herein. Hence, in some embodiments, the amount of a water-soluble ingredient in the loose mixture of foodstuff ingredients is less than 15 wt % of the total weight of the mixture; alternatively, the amount of a water-soluble ingredient in the loose mixture of foodstuff ingredients is less than 12 wt %, less than 10 wt %, less than 7 wt %, less than 5 wt %, or less than 3 wt % of the total weight of the mixture.

The term "snack bar", as used herein, refers to a RTE food product, typically in the shape of a flat box, but may essentially take any form or shape; hence, the use of the word "bar" should not be taken as limiting to a particular shape. A snack bar is an edible object, which has a well-defined shape, as opposed to a soft object, a paste, a liquid, an assembly of particles or a powder. A snack bar, in the context of the present invention, can sustain considerable force without breaking or crumbling, but will yield to a bite and a subsequent chewing required for consumption thereof. Hence, as used herein, the term "snack bar" is a structure and texture defining term, reading on the most widely accepted perception of the term in the food market; however, it is not shape-limiting.

The sensory (organoleptic) and mechanical (physical) attributes of a snack bar can be determined by a panel of trained tasters for sensory attributes, and by tools and machines for mechanical attributes.

Table A below presents some sensory attribute definitions and evaluation techniques of snack bars (listed in order of attribute rating), which are also used to define a snack bar and differentiate it from other food products that may contain similar or identical foodstuff ingredients.

TABLE A

| Attribute | Definition | Technique | Scale |
|---|---|---|---|
| Sample recovery* | The distance the sample recovers after 10 seconds | Compress the sample quickly and smoothly (in the center of the sample) between the index finger and plate to 50% of its original height and then release immediately in one motion. | No recovery - Full recovery |
| Return time for springiness* | The amount of time necessary for the sample to recover. The faster the sample returns, the greater springiness it possesses. | Compress the sample quickly and smoothly (in the center of the sample) between the index finger and plate to 50% of its original height and then release immediately in one motion. | No return - Returns quickly |
| Firmness† | The amount of force required to compress the sample with molars. | Place sample between molars, bite down with even pressure. | Not firm - Firm |
| Moistness† | The amount of moisture/oiliness/ wetness perceived in the mass during chewing. | The sample is chewed with the molars. Evaluation of moistness is made at the same stage of chewing for every sample | Very dry - Very moist |
| Chewiness† | The number of chews required to prepare sample for swallowing. | Chew sample between molars at a constant rate and pressure until ready for swallowing on one side of the mouth only. | Few chews - Many chews |
| Crumbliness‡ | The rate, ease and degree to which sample disintegrates or breaks down. | Place a sample between the molar teeth, compress partially and chew 3 times without fully compressing the sample. | Not crumbly - Very crumbly |
| Mouthfeel‡ | The degree to which distinct grainy, gritty, small particles, seeds, skins lumpy particles or other inclusions are perceived in the mass. | Evaluate as the sample is chewed to swallowing point. Chew sample to bolus (swallowing) point with molars and evaluate during chewing and at bolus. | Smooth - Gritty |
| Adhesiveness to the teeth‡ | The degree to which product sticks to surface of teeth after swallowing. | After swallowing the sample, feel the tooth surfaces with tongue. | None - Very much |

*Evaluated using a big sample.
†Evaluated using the first smaller sample.
‡Evaluated using the second smaller sample.

Five instrumental tests, three-point bending test, cut [shear] test, puncture test, texture profile analysis (TPA) and modified TPA, are typically carried out on each bar variant using machines such as, for example, an Instron Universal Testing Machine (Model 4444, Instron, High Wycombe, U.K.) fitted with a 500-N load cell, affording 29 instrumental parameters (listed in Table B below). Tests are typically conducted at room temperature (approximately 20° C.), while calculating mean values for each bar variant, from multiple measurements.

The three-point bending test is typically performed using a triple anvil apparatus. The whole, intact bar sample, or a standard size unit thereof, is placed across two support anvils, e.g., 65 mm apart (L, mm), and force is applied to the center of the bar by a third anvil until fracture occurred. The breaking force (F, N), the deflection of the center of the bar at the point of break (D, mm) and the slope of the tangent of the initial straight-line portion (m, N/mm) are determined from the force-deformation curve. The fracture stress (s, kPa), the fracture strain (r) and the elastic modulus (E, kPa) are calculated by the following equations (ASTM Standard D790-90 1990):

$$\sigma=3FL/2bd^2 \quad \text{Equation (1)}$$

$$r=6Dd/L^2 \quad \text{Equation (2)}$$

$$E=L^3m/4bd^3 \quad \text{Equation (3)}$$

where b and d are the width and thickness of the bar (mm), respectively.

In the cut (shear) test, the sides of the whole, intact bar samples are removed using a knife and mitre box/board, leaving about 30-mm-wide strip. The trimmed samples are placed on a base plate of the measuring machine and then cut to 70% of their original thickness with a specialized blade.

In the puncture test designed for full penetration, a half bar sample, such as produced for the three-point bending test, is placed on a plate with a 10-mm (diameter) hole, which is raised above the base plate of the measuring instrument by a circular ring. A suitably sized punch probe is used to puncture the top crust and to penetrate the interior crumb and the bottom crust of the bars.

In the texture profile analysis (TPA), half bar samples such as those produced for a three-point bending test are cut into 20×20 mm square samples by removing the side and end crusts using a knife and a mitre box/board. Samples are placed on the base plate of the measuring device and compressed twice to 50% of their original thickness (i.e., 50% deformation) by a suitably-sized compression plate.

In a modified TPA, half bar samples such as those produced for a cut (shear) test are cut into samples 30×30 mm square in cross-section using a knife and mitre box/board. Samples are then placed on the base plate of the measuring instrument and then compressed twice to 50% of their original thickness (i.e., 50% deformation) by a suitably-sized probe.

Table B below presents some mechanical attribute definitions and evaluation techniques of snack bars, which are also used to define a snack bar and differentiate it from other food products that may contain similar or identical foodstuff ingredients. The table presents instrumental parameters extracted from force-deformation curves obtained in five exemplary instrumental tests.

TABLE B

| Variable name | | Units |
|---|---|---|
| | Three-point bending test | |
| Fracture stress | Calculated by Eq. (1) | kPa |
| Fracture strain | Calculated by Eq. (2) | [—] |
| Fracture energy | Area under the bending curve | Nmm |
| Elastic modulus | Calculated by Eq. (3) | MPa |
| Initial slope | Slope calculated at the beginning of the bending curve | N/mm |
| | Cut (Shear) test | |
| Cutting force | Maximum load applied to the samples during cutting | N |
| Cutting energy | Area under the cutting curve | Nmm |
| Initial slope | Slope calculated at the beginning of the cutting curve | N/mm |
| | Puncture test | |
| Puncture force | Maximum load applied to the sample to puncture | N |
| Puncture energy | Area under the puncture curve | Nmm |
| Initial slope | Slope calculated at the beginning of the puncture curve | N/mm |
| | Standard TPA | |
| Hardness 1 | Maximum load applied to the samples during the first compression | N |
| Compressive energy 1 | Area under the curve for the first compression | Nmm |
| Hardness 2 | Maximum load applied to the samples during the second compression | N |
| Compressive energy 2 | Area under the curve for the second compression | Nmm |
| Hardness ratio | Ratio of the maximum load applied to the samples during the second compression to that applied to the samples during the first compression | [—] |
| Cohesiveness | Ratio of the area under the curve for the second compression to that under the curve for the first compression | [—] |
| Springiness | Ratio of the duration of contact with the sample during the second compression to that during the first compression | [—] |
| Chewiness | Mathematical product of hardness, cohesiveness and springiness | N |

TABLE B-continued

| Variable name | | Units |
|---|---|---|
| Adhesiveness | Area under the negative part of the curve immediately after the first compression (i.e. during withdrawal of the compression plate) | Nmm |
| | Modified TPA | |
| Hardness 1 | Maximum load applied to the samples during the first compression | N |
| Compressive energy 1 | Area under the curve for the first compression | Nmm |
| Hardness 2 | Maximum load applied to the samples during the second compression | N |
| Compressive energy 2 | Area under the curve for the second compression | Nmm |
| Hardness ratio | Ratio of the maximum load applied to the samples during the second compression to that applied to the samples during the first compression | [—] |
| Cohesiveness | Ratio of the area under the curve for the second compression to that under the curve for the first compression | [—] |
| Springiness | Ratio of the duration of contact with the sample during the second compression to that during the first compression | [—] |
| Chewiness | Mathematical product of hardness, cohesiveness and springiness | N |
| Adhesiveness | Area under the negative part of the curve immediately after the first compression (i.e. during withdrawal of the compression plate) | Nmm |

For a more detailed description and evaluation of sensory texture and mechanical attributes of snack bars, see, Kim, E. H.-J. et al., *Journal of Texture Studies,* 2009, 40(4), pp 457-481.

Nutritional Value:

Nutritional value or nutritive value as part of food quality is the quantitative measure of the essential nutrients carbohydrates, fat, protein, minerals, and vitamins in items of food. In colloquial speech, the term "nutritional value" is often taken to mean the caloric value of a food item only, a restriction that can lead to confusion when comparing the values of different diets, however, in the context of aspect of the present disclosure, the term "nutritional value" refers to the entire scope of carbohydrates, fat, protein, minerals and vitamins, or to any one of these alone, or to any combination thereof. The snack bar, according to aspects of the present disclosure, are characterized by substantially preserving the original nutritional values of the foodstuff ingredients. In other words, the per-mass nutritional value of the combined foodstuff elements is essentially the same as the per-mass nutritional value of the snack bar. It can also be extended to each of the individual foodstuff ingredients, namely that the nutritional value of any of the individual foodstuff ingredients of the snack bar is essentially preserved during the process of preparing the snack bar from the foodstuff ingredients—a characteristic that stems from the unique process of manufacturing the snack bar provided herein, and this feat cannot be achieved by any other method for forming snack bar, as all other forms of binding alters the nutritional value of the ingredient, either by adding carbohydrate, or by cooking/heating the foodstuff ingredients to temperatures higher than 80° C., 90° C. or 100° C. It is known the high temperatures and exceedingly high pressure alters the nutritional value of foodstuff by more than one way, including partial or full cooking, extraction of aqueous liquids and extraction of oils. The snack bar according to aspects of the present disclosure comprises uncooked food elements that have not gone through any process that may have substantially alter their nutritional value.

The terms "pre-process nutritional value" and "pre-process water activity", refer to the mixture of foodstuff that undergoes the process to become a snack bar, as defined herein, whereas these values are used to evaluate the effect of the process thereon, by comparing the pre-process values to the "post-process nutritional value" and the "post-process water activity".

Thus, according to some embodiments of the present invention, the nutritional value of the combined foodstuff ingredients prior to the formation of the snack bar, namely the pre-process nutritional value, can be substantially the same as the nutritional value of the snack bar after its preparation, namely the post-process nutritional value. More specifically, any of the specific nutritional value pertaining to any one of carbohydrates, fats, proteins, minerals and/or vitamins found/measured in each of the individual foodstuff ingredients or the combined foodstuff ingredients prior to the formation of the snack bar, can be less than 5%, less than 4%, less than 3%, less than 2%, less than 1% or less than 0.5% higher than the specific nutritional value of the same, as found/measured in the snack bar after its preparation. In other words, the pressure and sonication can be controlled in the herein-provided process so as not alter the nutritional value, since the foodstuff is not cooked during the process of preparing the snack bar, and the ingredients do not lose oil or other elements thereof.

According to some embodiments of the present invention, the mechanical, textural, consistency and organoleptic sensory attributes of the binder-free snack bar provided herein, are similar to those of known snack bars prepared by traditional methodologies using a binder. In some attributes, the presently provided snack bar are superior to the binder-based known snack bars, particularly the chewiness, mouthfeel and stickiness to teeth.

While reducing the present invention to practice, it was observed that the kinetics of water absorption and retention by the loose mixture of foodstuff ingredients plays an important role in the properties of the finished snack bar product, namely the amount and location of water in the mixture is critical for a successful process of forming the snack bar, as expressed in the mechanical properties of the finished product.

It was found that while some ingredients are inherently wet, and others are inherently dry and/or are further dried and/or roasted before added to the mixture (for taste and/or regulatory reasons), water is not distributed evenly in and/or on and between the ingredients, and water may further be absorbed by the ingredients when given sufficient time between mixing the foodstuff ingredients with water in preparation for the US welding process.

Water activity ($a_w$) is the partial vapor pressure of water in a substance divided by the standard state partial vapor pressure of water. In the field of food science, the standard state is most often defined as the partial vapor pressure of pure water at the same temperature. In the context of embodiments of the present invention, the term "water activity" refers to water vapor partial pressure.

The snack bar, according to embodiments of the present invention, is also characterized by a water activity that meets the requirements of the food industry for complying with safety and shelf life standards and criteria. Thus, according to some embodiments of the present invention, the snack bar provided herein is characterized by a water activity of less than 0.8, 0.7, 0.6, 0.55 or less than 0.5 water vapor partial pressure.

According to some embodiments of the present invention, the water content (moisture) of the combined foodstuff ingredients prior to the formation of the snack bar, namely the pre-process water content, prior to any preparatory step of the process, including adding water to arrive at a desired welding water activity, can be substantially the same as the water content of the snack bar after its preparation, namely the post-process water content. More specifically, the water content pertaining to the mixture of ingredients as a whole (the combined or average water content/moisture) prior to the formation of the snack bar, can vary by less than 5%, less than 4%, less than 3%, less than 2%, less than 1% or less than 0.5% compared to the water content of the finished product (a pristine snack bar). This property can be achieved by applying the process as defined herein, or by adjusting the water content before or after the process is carried out. In other words, the pressure and sonication can be controlled in the herein-provided process so as not alter the water content, since the foodstuff is not cooked during the process of preparing the snack bar, and the ingredients do not lose water as a result of effecting the process.

Binder-Free Snack Bar:

The snack bar provided herein is unique in the sense that while it is comparable to standard and known snack bars in the market in terms of sensory and mechanical attributes, and in some criteria even superior thereto, it is essentially devoid of any added binder material or substance.

In other words, a prior art snack bar can be very similar, even identical, in its composition of foodstuff ingredients, except for including a substance that binds the foodstuff ingredients together, whereas the snack bar according to embodiments of the present invention, is devoid of such substance while the foodstuff ingredients it comprises are fused into an object by sonic energy.

The term "binder", as used herein in the context of embodiments of the present invention, refers to a substance that is added to a mixture of foodstuff ingredients constituting the snack bar, and is not regarded as one of the foodstuff ingredients per se; namely the binder is not individually identifiable among the foodstuff ingredients, and not part of one or more of the foodstuff ingredients, or extracted in situ from one or more of the foodstuff ingredients during the process of preparing the snack bar.

Typically in the context of RTE snack bars, a binder is a carbohydrate-based sticky substance that produces or promotes cohesion in loosely assembled whole, broken or powdered foodstuff ingredients. Being part of an edible food product, the binder is typically water-soluble to some extent, such that it can be consumed by chewing and swallowing the snack bar. Some of the most widely used binders in the snack bar industry are based on one or more sugars, sugar alcohols, polyols, starch, syrup, glycols, carbohydrate gums, and any combination thereof. Alternatively, a snack bar binder may be or comprise proteins, such as gluten, egg protein (egg-white, egg-yolk) and other plant or animal based proteins. In the context of some aspects of the present invention, a binder is set apart of all other foodstuff ingredients of the bar, by being soluble and thus removable from the bar itself, and essentially separable from all other foodstuff ingredients of the bar. Thus, an alternative definition of the term "binder" as used in the context of aspects of the present disclosure, is a water-soluble substance that binds the foodstuff ingredients of the snack bar, and can be removed therefrom by dissolution in water.

In the context of embodiments of the present invention, a binder-free snack bar (substantially devoid of a binder) as provided herein, according to embodiments of the present invention, is different than known snack bars that are held together as a monolithic bar due to the use of a water-soluble binder, in that the ingredients of the presently disclosed snack bar are fused to one-another at their contact points after being "welded" using ultrasonic energy to effect that fusion. The welding process is not based on the presence of a water-soluble binder, which can easily be tested by a binder-dissolution assay, as presented hereinbelow. Without being bound by any particular theory, it is assumed that the during the welding process, ultrasound energy causes some of the substances on the surface of the foodstuff ingredients to behave like "hot glue" and form bridging contacts where the ingredients were in physical contact. These bridging contacts are not water-soluble to a significant level, which makes the mechanical integrity of the snack bar provided herein less affected by immersion in water. In addition to the lower sensitivity of the bridging contact to dissolution in water, the snack bar provided herein will lose far less mass to the water it is immersed in, compared to a snack bar bound by a water-soluble binder (Brix).

In the context of embodiments of the present invention, the snack bar is substantially devoid of an added carbohydrate-based binder material, including sugar (not part of one or more of the foodstuff ingredients), such as, without limitation, glucose, fructose, galactose, sucrose, lactose, maltose, dextrin, dextran, and any oligomeric, polymeric, co-polymeric, hydrogenated, gum and/or syrup form and mixture thereof. In the context of embodiments of the present invention, the snack bar provided herein is substantially devoid of an added protein-based binder material, including plant protein (not part of one or more of the foodstuff ingredients), such as, without limitation, gluten, and animal protein, such as, without limitation, egg-protein (preferably egg-white).

In the context of embodiments of the present invention, the snack bar is substantially devoid of an added sugar alcohol, such as, without limitation, sorbitol (E420), mannitol (E421), isomalt (E953), maltitol (E965), lactitol (E966), xylitol (E967), erythritol (E968), and any polymeric, hydrogenated, gum and/or syrup form and mixture thereof.

Figure 5A:
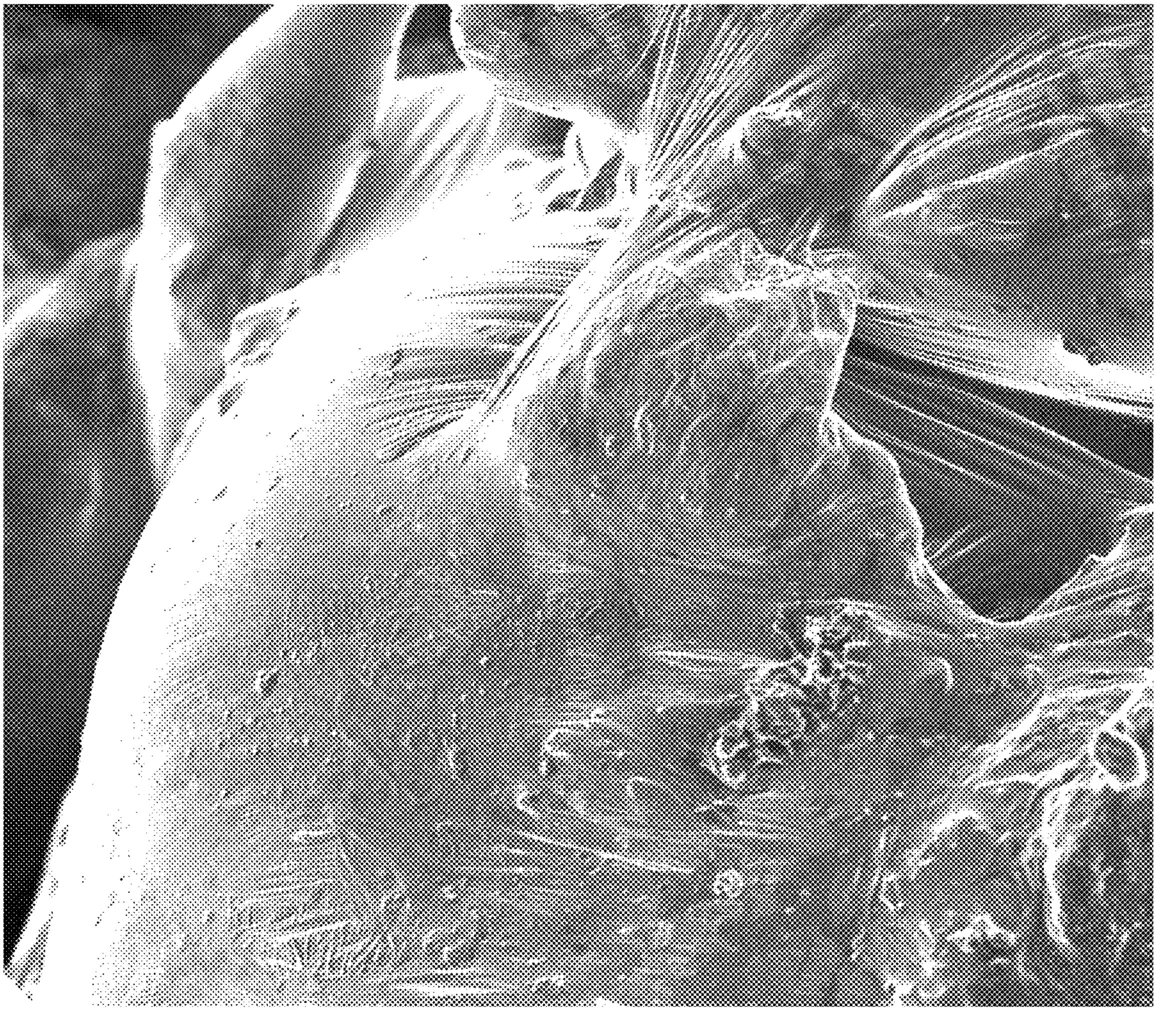
FIGS. 5A-B are comparative electron microscope images taken for a commercially available snack bar comprising honey as a binder (Madagascar Vanilla Almond by KIND®, FIG. 5A), and for an exemplary snack bar comprising similar foodstuff ingredients except for a binder, prepared according to the process provided herein, according to some embodiments of the present invention, wherein the coating on the binder over and bridging the ingredients are clearly visible in FIG. 5A, while the snack bar in FIG. 5B shows welding points between bare ingredients surface.
Figure 5B:
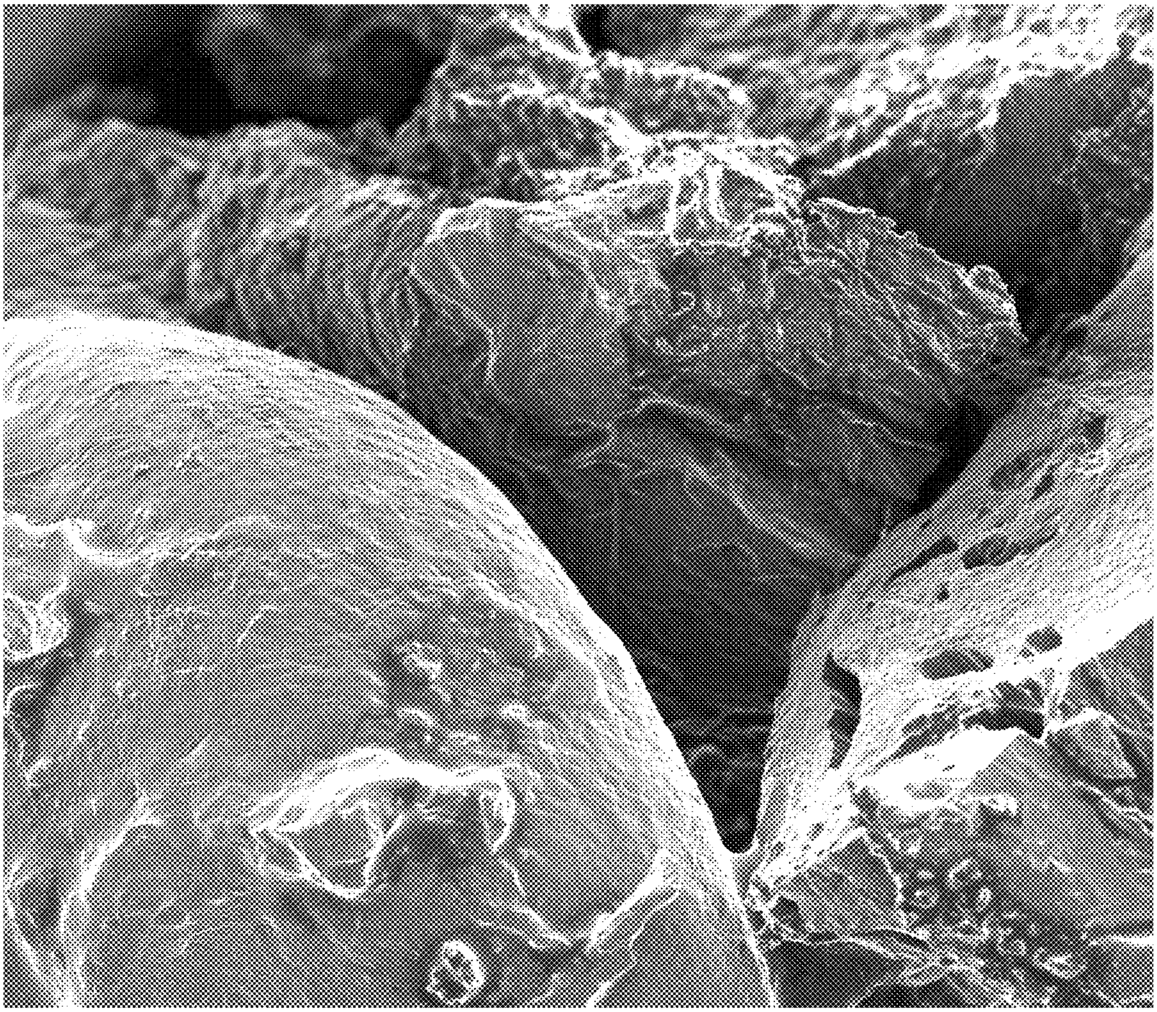

One method for determining the presence of a binder in a snack bar, is by visualizing the surface of the foodstuff ingredients therein, and observing the gloss and/or otherwise other signs of the presence of a binder, particularly when breaking the snack bar and observing what used to be the interface between to bits of foodstuff. A binder will typically leave a trace in the form of glassy edges, or stringy/fibrous material where to foodstuff ingredients were joined thereby. The presence or lack thereof of a binder can be detected by electron microscopy, where the snack bar is scanned at the exterior surface or at a surface exposed by breakage. This feature is visualized in FIGS. 5A-B.

A texture analyzing test may be used to detect the presence of a binder in a snack bar or the lack thereof, using any industry-acceptable texture measuring procedure, including mechanical (instrumental) measurements, as well as the use of human sensory panels, trained to determine food product characterization. The typical instrumental food texture analyzer offers a quantitative approach, aimed at driving down costs through fast, efficient testing without compromising on data accuracy or reproducibility.

The typical texture analyzer instrument is designed specifically for routine textural testing and texture profile analysis via accurate force measurements. A texture analyzer instrument may include a base machine, drip tray, food-testing base (one or more anvils) and probes, for routine entry-level applications. Texture Profile Analysis (TPA) is commonly used to measure snack bar crispiness, break strength, and more. Through TPA, a manufacturer of the herein-provided snack bar is able to adjust ingredient ratios, assess wetting, pressing and sonic variables, and determine shelf life. TPA data can then be correlated against human sensory panels as a final check. Once such TPA profiles have been defined, the procedure can then be transferred to the production line for standard testing in during quality control.

Figure 2:
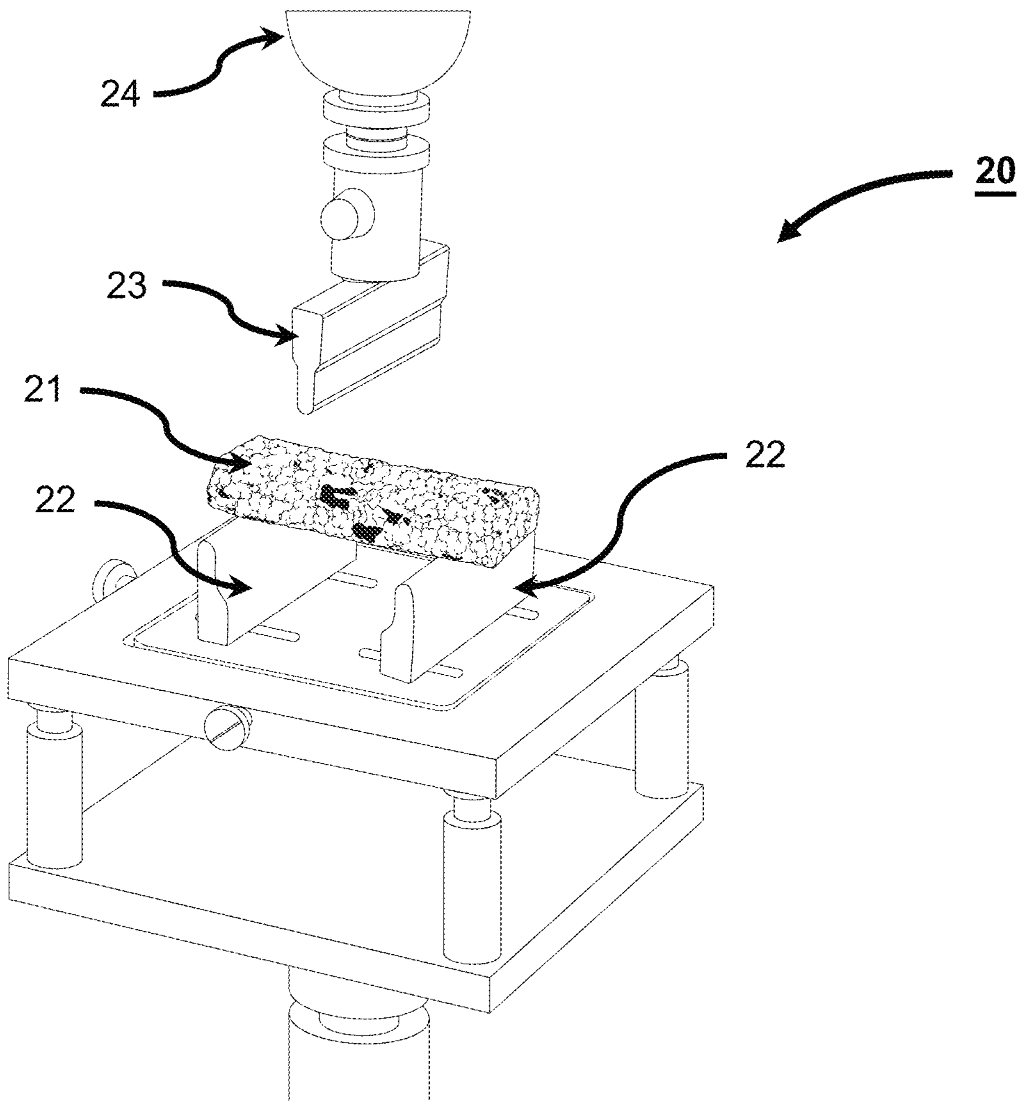
FIG. 2 is a photograph of an exemplary prior art device for conducting texture profile analysis (TPA) measurements, wherein instrument 20, set to execute a three-point bending test on snack bar 21 disposed on anvils 22, include blade probe 23 set to press down on snack bar 21 by the force applied by piston 24, whereas the force required to bend or break snack bar 21 is recorded and used.

FIG. 2 is a photograph of an exemplary device for obtaining texture profile analysis (TPA) measurements, wherein instrument 20, set to execute a three-point bending test on snack bar 21 disposed on anvils 22, include blade probe 23 set to press down on snack bar 21 by the force applied by piston 24, whereas the force required to bend or break snack bar 21 is recorded and used.

According to some embodiments of the present invention, the snack bar is binder-free, as can be attested by an assay that analyzes the presence of a binder or lack thereof—an assay that is referred to herein as a "binder-dissolution assay" (see, for example, Example 15 in the Examples section that follows below). The objective of this assay is to show that the snack bar is held together by direct inter-element fused contacts rather than by an added water-soluble (edible) binder that would dissolve in the warm water and no longer hold the foodstuff ingredients together. It is believed that the ultrasonic welding, which is assumed to fuse the foodstuff ingredients to one-another, is less sensitive to dissolution in water, therefore a textural or mechanical property characterizing the snack bar will diminish by less than 90%, less than 80%, less than 70%, less than 60%, less than 50%, less than 40%, less than 30%, less than 20%, or less than 10%, compared to its original textural or mechanical property before the snack bar was let to soak in water under non-contact stirring.

Briefly, the assay includes measuring textural and mechanical properties of a snack bar sample of a predetermined size and mass, using an industry-acceptable instruments and protocols, and thereafter immersing the sample in water for a time period that is selected as sufficient to dissolve at least some of the binder, at least from the water-accessible surface of the snack bar, drying the sample to its original water content and/or water activity, and re-measuring the same textural and mechanical properties using the same instruments and protocols for comparison with the original properties. The binder-dissolution assay is based on the premise that a standard commercially available snack bar of a given contents and a binder would undergo notable changes in its textural and mechanical properties after being immersed in water, since at least some of the binder would dissolve in the water, and drying would not restore the lost binding. In sharp contrast, a sample of a snack bar according to the present invention, would not lose cohesion if immersed in waster, as no binder would be lost to the water. Hence, substantial retention of textural and mechanical properties before and after immersion in water demonstrates the absence of a binder in the presently disclosed snack bar. It is noted that water plays an important role in the welding process effected in the process provided herein, the presence of water does not reverse the welding of the snack bar during the binder-dissolution assay. It is also noted that more than one textural and mechanical properties are affected by the binder-dissolution assay, and any one of those can be used to determine the presence of a binder or lack thereof—in some embodiments, the selected textural and mechanical property is fracture stress, which can be assessed using, e.g., a three-point bending test.

Thus, the values of pre-assay textural and mechanical property is diminished by less than 50%, 25%, 10%, 5% or less than 2% of the value of the port-assay textural and mechanical property. According to some embodiments of the present invention, the snack bar is characterized by a pre-assay fracture stress, measured at a pre-assay water activity and content, that is substantially the same as a post-assay fracture stress, measured at substantially the same pre-assay water activity and content. Alternatively, the value of pre-assay fracture stress, measured at a pre-assay water activity and content, is diminished by less than 50%, 25%, 10%, 5% or less than 2% of the value of the port-assay fracture stress measured at substantially the same pre-assay water activity and content.

A typical binder-dissolution assay may include preparing a sample of a given snack bar having a known size and shape, measuring the water activity and water content of the sample, measuring at least one textural or mechanical property of the sample associated with the presence of a binder, immersing the sample under non-contact stirring in a known volume unit of distilled water pre-heated to 60° C. for 5 minutes, drying the sample to the original waster activity and water content, and re-measuring the same textural or mechanical property. An exemplary binder-dissolution assay is presented in Example 15 hereinbelow.

An alternative method for determining the presence of a binder or the lack thereof can be implemented by analyzing the presence of the binder in the water in which the binder supposedly dissolved into, or in the snack bar itself, which lost some of the mass of the binder to the water. The water can be tested for an increase in degrees Brix (° Bx) under certain conditions, such as volume, time and temperature of soaking the snack bar in purified/distilled water. The degrees Brix test, which is part of an assay referred to herein as a "binder-dissolution assay", is demonstrated in the Examples section that follows blow. Alternatively, a snack bar sample can be weighted and measured for moisture (water content) or water activity before and after soaking in water, provided that the post-soaking (post-assay) weighing is done for a dried sample having the same water activity of the snack bar before soaking. The loss of mass is therefore attributed to the dissolution of the binder into the water.

Alternatively, according to some embodiments of the present invention, the snack bar is characterized by exhibiting a fracture stress, as measured by a three-points bending test, that is at least 10% higher compared to the fracture stress of a comparable snack bar that is made using the same foodstuff ingredients at the same proportions, but the latter is held together by a binder as typically done in known snack bars hitherto (everything else equal except the mechanism of keeping the foodstuff ingredients held together into an object), after a size unit of the snack bar and of the comparable bar (prepared without sonic energy) are each immersed under non-contact stirring in a volume unit of distilled water at about 60° C. for 5 minutes, without drying. The objective of this assay is to show that the snack bar, according to embodiments of the present invention, is different than a comparable snack bar, being as similar as possible to the snack bar disclosed herein, except for comprising a binder. As the binder is expected to dissolve and wash away from the comparable snack bar, the snack bar provided herein will retain its integrity and be at least 10% harder than the binder-containing comparable snack bar after wetting, or at least 20% harder, at least 30% harder, at least 50% harder, at least 60% harder, at least 70% harder, at least 80% harder, at least 90% harder, at least 100% harder, at least 120% harder, at least 150% harder, at least 200% harder than the comparable binder-held snack bar that was let to soak in warm water for 5 minutes under non-contact stirring.

Further alternatively, according to some embodiments of the present invention, the snack bar provided herein is characterized by losing less than 5%, 10% or 20% of its original mass after submersion under non-contact stirring of a mass unit sample thereof in a volume unit of distilled water warmed to 60° C. for 2 minutes followed by drying to its original moisture level prior to the soaking experiment.

The term "size unit", as used herein, refers to a sample of the tested snack bar, cut into a measurable and reproducible dimensions. For example, a size unit is an arbitrary box-shaped piece having the dimensions of 4 cm by 4 cm by 2 cm (4×4×2 cm). It is recommended that the size unit would be smaller than the size of the entire manufactured snack bar so as to allow reproducible provision of as identical as possible comparable samples.

The term "mass unit", as used herein, refers to a sample of the tested snack bar, cut into a measurable and reproducible weight, and when compared to another sample, preferably similar in shape (dimensions). For example, a mass unit is a box-shaped piece weighing 33 grams. It is recommended that the mass unit be smaller than the mass of the entire manufactured snack bar so as to allow reproducible provision of as similar and comparable samples as possible.

The term "volume unit", as used herein, refers to an amount of a liquid, in which the samples of the tested snack bars are immersed. For example, a volume unit is a 150 ml of distilled water. It is recommended that the volume unit allow the immersion of an entire sample, namely large enough and in a suitable container so as to allow full submersion of the tested sample.

The phrase "under non-contact stirring", as used herein in the context of the assays described hereinabove, refers to a form of liquid stirring that does not involve moving/agitating the solid sample immersed in the liquid. For example, a stirring base that is place away from the sample so as not to touch the sample. Alternatively, the stirring may involve gentle agitation of the container holding the sample in the water, such that the sample experiences some mechanical motion which may accelerate disintegration of the sample into pieces when binding forces are weakened by dissolution or other effects of wetting by water. In some embodiments, the stirring may include some degree of physical contact of the stirring mechanism (e.g., a magnetic stirring bar) with the sample in order to more vigorously express the effect of binder dissolution on the integrity of the snack bar, when compared to the binder-free snack, of according to some embodiments of the present invention.

Alternatively, as a binder-free snack bar, the snack bar provided herein is characterized by increasing a Brix percentage of distilled water by less than 20 Brix %, less than 15 Brix %, less than 10 Brix %, less than 5 Brix %, or 2 Brix % after submersion under non-contact stirring of a sample thereof in the water. More specifically, a binder-dissolution assay can be carried out by immersing a 33 grams of the snack bar in 150 ml distilled water at 60° C. for at 2 minutes, and measuring the change in Brix percentage.

Identifiable Foodstuff Ingredients:

The snack bar provided herein is characterized, inter alia, by comprising essentially identifiable foodstuff ingredients, or in some embodiments, comprising only foodstuff ingredients that are essentially identifiable. The term "identifiable", as used in the context of embodiments of the present invention, refers to the visibility and appearance of individual parts, morsels and pieces comprising the snack bar, such as whole or morsels of foodstuff that one can identify as being, or belonging to, for example, an almond, an pecan nut, a raisin, a slice of an recognizable fruit or piece of a recognizable vegetable, a seed, a cereal or any other foodstuff ingredient that is used in the mixture of foodstuff constituting the snack bar. An example of a non-identifiable foodstuff ingredient may be a powdered foodstuff ingredient, a solubilized foodstuff ingredient, a crushed foodstuff ingredient, a pureed foodstuff ingredient, or otherwise a foodstuff element that cannot be identified by its appearance. It is noted herein that the presently disclosed snack bar may include some foodstuff ingredients that are not identifiable, however, the majority of the content thereof includes essentially identifiable foodstuff ingredients, up to at least 40%, 50%, 60%, 70% 80%, 90% and up to 100% essentially identifiable foodstuff ingredients of the snack bar content, according to some embodiments of the present invention.

Figure 3:
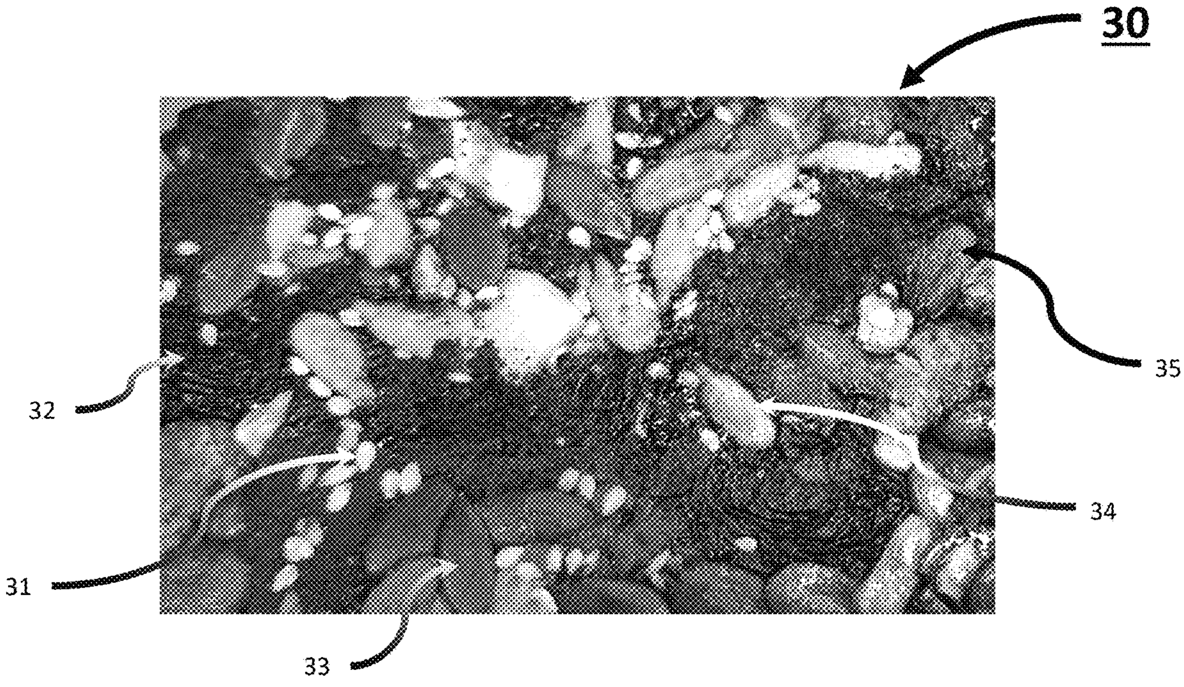
FIG. 3 is a photograph showing an exemplary snack bar according to some embodiments of the present invention, prepared by the process provided herein, showing snack bar 30, wherein sesame seeds 31, raisins 32, pumpkin seeds 33, sunflower seeds 34, and almonds 35, among other foodstuff ingredients, are fused together yet are discernable and essentially maintaining their shape and form after compressions and US welding without the addition of a binder.

FIG. 3 is a photograph showing an exemplary snack bar according to some embodiments of the present invention, prepared by the process provided herein, showing snack bar 30, wherein sesame seeds 31, raisins 32, pumpkin seeds 33, sunflower seeds 34, and almonds 35, among other foodstuff ingredients, are fused together yet are discernable and substantially maintaining their shape and form after compressions and US welding without the addition of a binder.

Figure 4:
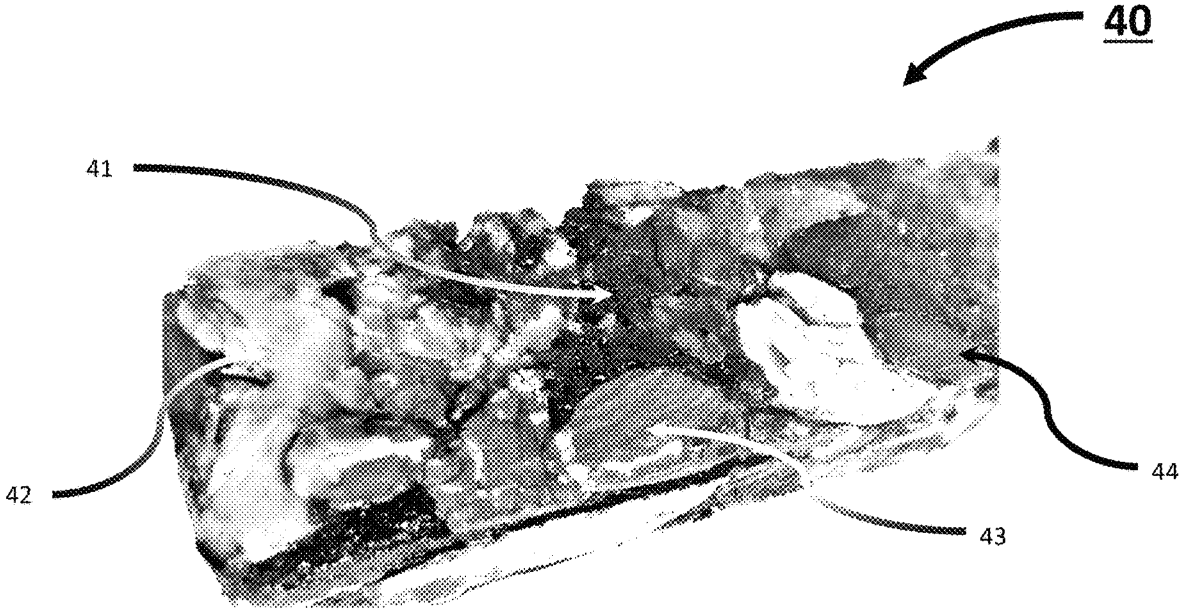
FIG. 4 is a photograph showing an exemplary snack bar according to some embodiments of the present invention, prepared by the process provided herein, showing snack bar 40, wherein dried beet 41, dried mango 42, almonds 43, and pumpkin seeds 44, among other foodstuff ingredients, are fused together yet are discernable and essentially maintaining their shape and form after compressions and US welding without the addition of a binder.

FIG. 4 is a photograph showing an exemplary snack bar according to some embodiments of the present invention, prepared by the process provided herein, showing snack bar 40, wherein dried beet 41, dried mango 42, almonds 43, and pumpkin seeds 44, among other foodstuff ingredients, are fused together yet are discernable and substantially maintaining their shape and form after compressions and US welding without the addition of a binder.

As can be seen in FIG. 3 and FIG. 4, the snack bar provided herein, produced by the process disclosed herewith, includes visibly whole and well defined foodstuff ingredients that are not coated by any binder, and are not cooked or grounded in order to form a solid monolithic RTE object, thus retain their nutritional value without adding the chemistry and/or calories of a binder.

According to some embodiments of the present invention, the foodstuff ingredients of the snack bar provided herein are essentially dry, or having a water activity lower than about 0.85, 0.8, 0.7, 0.6 or less than 0.55. The dryness/moistness of the snack bar can be adjusted during the manufacturing process by adding water to the mixture, or by post-process drying or wetting.

According to some embodiments of the present invention, the foodstuff ingredients of the snack bar provided herein are ready-to-eat, and require no further cooking. In some embodiments, the foodstuff ingredients of the snack bar provided herein are uncooked, and are used raw or dehydrated. In general, the term "uncooked", as used in the context of some embodiments of the present invention, refers to the absence of foodstuff that has been treated by heat to cause adhesion thereof. In some embodiments, the snack bar may contain at least some foodstuff ingredients that are preprocessed, such as roasted foodstuff (mainly nuts and/or seeds), rolled or puffed foodstuff (mainly cereals and grains), and other foodstuff that does not fall under the category of nuts, seeds, cereal, fruits and vegetable, such as chocolate, candy, dried yogurt, dried meat, sugared fruit and the likes. Thus, the term "uncooked" as used in the context of the snack bar provided herein, refer to adhesion, cohesion, or binding of ingredients as a result of cooking some or all the ingredient.

According to some embodiments, the foodstuff which may be used in the snack bar provided herein, include, without limitation, nuts, cereals, seeds, fruits, vegetables, dry meat/dairy products, and any combination thereof. The foodstuff may be whole, if natural size is suitably small enough to be mixed with other foodstuff and molded into a bar shape; for example, whole almonds are suitably sized, and can be used intact, but may also be used in a reduced size when broken into smaller pieces, however, beetroot or carrot are too large to be used intact, and their dried form is typically available as small pieces or slices. Some foodstuff can be dried and grounded into a powder, however, these foodstuff are mainly used as flavorants and colorant, as they are not identifiable.

While some relatively wet ingredients, such as dates, fruits, berries and vegetables, can sometimes be compressed into a bar of essentially acceptable mechanical properties without adding a binder or applying US energy, essentially since the ingredients contain sufficient sugars and water that act as a natural sugary binder, the same would not form a stable snack bar if mixed with relatively dry ingredients, such as seeds, nuts, cereals and the likes, without added binder or US welding. Thus, according to some embodiments of the present invention, the loose mixture of foodstuff ingredients include at least 5%, 10%, 20%, 30%, 40%, 50%, 60%, 70%, 80%, or more than 90% dry ingredients, whereas a dry ingredient is defined as having less than 10% water content when used in the mixture.

A Process of Manufacturing:

According to an aspect of embodiments of the present invention, there is provided a process of manufacturing the snack bar provided herein, which is effected by:

Providing a mixture of the foodstuff ingredients;

applying a first compression force ($F_1$) to the loose mixture of foodstuff ingredients to thereby obtain a compressed mixture;

applying sonic energy while applying a second compression force ($F_2$) to the compressed mixture, thereby obtaining the snack bar, wherein $F_1>F_2$.

According to an embodiment of the invention, no ultrasonic energy is applied to the loose mixture of foodstuff ingredients while the first compression force is applied thereto.

According to an embodiment of the invention, the first and second compression forces are applied to their respective mixtures in a single pressing chamber.

According to an embodiment of the invention, the first and second compression forces are applied to their respective mixtures in different pressing chambers.

The process of manufacturing the snack bar provided herein is the gist of the present invention, that allows the snack bar to maintain an acceptable form and mechanical as well as sensory attributes without using a sugary/carbohydrate and/or a proteinous binder, and without compromising or substantially altering the nutritional value of the foodstuff ingredients used therein. The process employs sonic energy, and in particular sonic energy to weld the foodstuff ingredients to one-another while or after they have been pressed together; the sonic welding does not cook the foodstuff, and in fact it has been shown to raise the temperature on the exterior of the foodstuff ingredients to no more than 85° C., 80° C., 75° C., 70° C., 65° C. or less than 60° C.

Ultrasound requires a condense medium to travel in, whereas gas (air) is a very poor conductor for US energy. For the successful welding of a loose mixture of foodstuff ingredients, the mixture should have as little air pockets trapped therein as possible—this feat can be achieved by selecting a mixture of ingredient with a broad distribution of particle size, and/or by adding a small amount of a liquid (e.g., water), and/or compressing the mixture. Each solution of the air pockets problem has pros and cons—for example, not all products will have the optimal particle-size distribution, as this depends on the recipe for the mixture, some will have powdered ingredients and some will consist on whole foodstuff ingredients; water cannot be used in excess to fill in the air pockets since excess water will boil during US energization, leading to overheating, cooking and mechanical breakdown of the bar, and further may adversely alter the desired or required composition of the bar, allowing microbial growth (water activity); and finally, while sufficient pressure can eliminate most of the air pockets in the loose mixture, too much pressure will crush and/or cook the ingredients, cause oil secretion (oil-pressing) and may form a too hard bar (over-hardening). The present invention therefore provides the metes and bounds for an optimal foodstuff welding process, which is general for all mixture and process devices and machinery.

The process is based on a tight physical contact between the ingredients to be welded together, and on the mediation of wetness (water) to transfer the ultrasound (US) energy between the ingredients throughout the bulk of the loose mixture while it is being welded. The tight physical contact between the ingredients is afforded by a compression force that is applied to the loose mixture of foodstuff ingredients, and the wetness is afforded by the addition of water shortly before the compression is effected thereon. The term "welding water activity", discussed below, refers to the parameter that is monitored, and may be adjusted shortly prior to effecting the compression on the mixture as one of the preparatory steps of the process. Adjusting the welding water activity is typically done by adding the smallest amount of water to the mixture, mixing the ingredients thoroughly, and measuring $a_w$. This relatively small amount of water would wet the outer surface of the ingredients, and assist in filling air gaps between the ingredients for more effective US welding. This relatively small amount of water would not be sufficient to dissolve significant parts of the ingredients, and would not be comparable to the amount of binder that is added to presently known snack bars.

In some embodiments of the present invention, the mixture of foodstuff is compressed prior to applying the sonic energy (e.g., ultrasonic energy) to effect welding, and the compressed mixture is thereafter subjected to the sonic energy, wherein the two steps may be conducted in one chamber or in two separate chambers. In some embodiments, the compression of the mixture is followed by sonic energization, while the compression is still effected on the mixture.

The first compression force ($F_1$) is applied to the loose mixture of foodstuff ingredients at a level that can compact the mixture tightly, but not too tight, as several undesired outcomes may occur—the mixture will become a too-hard brick that cannot be bite into or chewed (i.e., undergo over-hardening), and/or oil may be pressed and extracted out of some of the ingredients, and/or the ingredients will be over-heated and cooked. Thus, ($F_1$) is preferably limited by two upper cutoff values that can be experimentally determined rather simply, using the same tools used for the process itself, an oil-pressing assay and an over-hardening assay. These assays are described below and will be clear to a person of ordinary skills in the art.

A compressed mixture is the result of applying the first compression force on the loose mixture of foodstuff ingredients. According to embodiments of the present invention, a compressed mixture does not have the mechanical properties of the finished product—it is not a snack bar, since the ingredients are not fused to one-another, and the compressed mixture will crumble to its original particulate form upon mild pressure.

The term "oil-pressing force" refers to a maximal $F_1$, above which the compression results in an unacceptable oil extraction. Briefly, to determine the force at which an unacceptable oil extraction level is detected, i.e., to determine the oil-pressing force, the user may apply an increasingly growing force of a given loose mixture of foodstuff ingredients, and record an oil-pressing force at an unacceptable oil extraction. This concept is exemplified and demonstrated in Example 19, under the Examples section that follows hereinbelow.

The term "over-hardening force" refers to a maximal $F_1$, above which the compression results in an unacceptable hardening. Briefly, to determine the force at which an unacceptable hardening occurs, i.e., to determine the over-hardening force, the user may apply an increasingly growing force of a given loose mixture of foodstuff ingredients, and record an over-hardening force by measuring hardness by known and widely acceptable protocols and industry acceptable criteria for RTE snack bars. An over-hardening assay for determining the over-hardening force is within the skills and abilities of any person of ordinary skills in the art.

The use of the term "unacceptable" is meant to say that the process allows the user to control the level of the characteristics at hand, and set the level according to a specific preference, demand or limitation, and to say that the product can be tailor-made to stand by the relevant preferable taste or imposed regulation, whereas the unacceptable level should be, and can be avoided by selecting proper relevant process parameters, according to some embodiments of the present invention, as described herein. For example, if one seeks to substantially maintain the nutritional value of the individual foodstuff ingredients used to prepare a given snack bar, one should avoid oil-pressing; similarly, if the regulation for maximal hardness of a RTE snack product dictates a certain value for over-hardness, it is imperative that this over-hardening level is not reached when pressing the mixture.

In some embodiments of the present invention, the first compression force ranges from 100 $N/cm^2$ to 460 $N/cm^2$.

A second compression force ($F_2$) is applied to the compressed mixture of foodstuff ingredients at a level that can assist in the transmission of US energy throughout the compressed mixture. Without being bound by any particular theory, it is assumed that the foodstuff items should be brought into close proximity to form a dense monolith of compressed matter, and when the sonic energy is applied, it energizes the contact points between individual foodstuff ingredients in the mixture, causing the interface between the elements to heat locally and fuse, while the rest of the mixture is less effected by the sonic energy as very little liquid medium is present in the mixture to transfer that energy and turn it into heat.

Pressure during welding is needed to couple the US horn tightly (tight physical contact) with the foodstuff, which also acts as a US medium that allows the US energy to travel through the bulk of the mixture. However, while compression is part of the US welding process, compression may have a damping effect on the operation of the US horn, which is the part of the welding machine that vibrates at US frequencies and therefore is in direct contact with the compressed mixture. In some embodiment the US horn is used to effect compression and US energization simultaneously. The use of the US horn for the second compression, and the need to allow the horn to vibrate at US frequency and amplitude, sets an upper limit to the intensity of $F_2$. The maximal value of $F_2$ is referred to herein as the "a sonic energy damping force". The a sonic energy damping force can be determined experimentally at the same methods and machineries used for the process—the pressure is applied gradually until the energy-transfer probe registers a decrease in the transferred US energy, as which point the compression force is recorded and used to set the maximal value of $F_2$. It is noted herein that by the use of the term "US horn" it is meant that the machine part that comes in contact with the mixture for compression, is also the machine part that transmits the US energy—hence, in some embodiments wherein $F_2$ and US energy are applied simultaneously, the term "US horn" is used to refer to the machine part that effects compression and US transmission simultaneously, regardless of the particular design or definition of the US welding device in use. It is noted herein that when the compression is effected while US energy is transmitted into a sample, the US horn experiences the compression regardless of the shape, design or configuration of the mold, being open on one side or more (e.g., a "sleeve" mold that is open on two sides).

Since the US energy transmission and the compression effected by the US horn may vary depending on the specific machine and other parameters of the process, a sonic energy damping force may be determined as part of the preparatory steps of the process, by pressing the compressed mixture using the given ultrasonic horn at an increasingly growing force and recording the sonic energy damping force of the given US welding machine, or the US energization station in the snack bar making machine. This concept is exemplified and demonstrated in Examples 18 and 21 hereinbelow. According to some embodiments of the present invention, a sonic energy damping force can be determined based on any US energization parameter available for measuring, including US traveling speed, US frequency, US amplitude, overall US wattage delivered, and any combination thereof. Alternatively, the sonic energy damping force can be determined according to a US damping analysis recommended by the manufacturer of the US welding device.

Without being bound by any particular theory, it is assumed that when reaching sonic energy damping force during the US welding process of a compressed mixture of foodstuff ingredients, US energy is not transmitted effectively to the bulk of the mixture, or at all, leading to non-homogeneous distribution of US energy throughout the mixture. Ineffective transmission of US energy in the bulk of the mixture may lead to insufficient welding, or partial welding, particularly on the surface or outer layers of the mixture; obviously, operating the US welding at suboptimal setting is also wasteful and damaging to the device. On the other hand, operating a process in which the compression of the mixture is limited to sonic energy damping force ($F_1 \leq F_2$), will result in an inferior product since the loose mixture would not be packed tightly enough to allow US energy to weld the ingredients to a sufficient level (see Example 18 hereinbelow). It is noted herein that in some embodiments of the invention, the snack bar's dimensions may be small.

Thus, in some embodiments $F_2$ is set to below a sonic energy damping force, namely a compression force that reduces the US energy transmission into the mixture in the mold by no more than 50%, 40%, 30%, 20%, or less than 10%. Alternatively, $F_2$ is selected at a level that reduced the US energy transmitted into the mold at the horn by no more than 20%. In some embodiments of the present invention, the second compression force ranges from 10 N/cm$^2$ to a sonic energy damping force.

According to some embodiments of the resent invention, $F_2$ is applied gradually, or stepwise, an approach that was found to produce superior snack bars in terms of mechanical properties, as demonstrated in Example 18. Without being bound by any particular theory, it is assumed that the gradual increasing force prevents hardening of the layers closer to the US horn, allowing the US energy to reach the bulk of the sample. Hence, in some embodiments of the present invention, while applying sonic energy to the compressed mixture, $F_2$ is applied gradually or stepwise from 3 N/cm$^2$ to said sonic energy damping force, or less.

Preferably, $F_2$ is applied at a compression force that afford acceptable welding results, as can be determined by industry standard protocols and requirements (discussed hereinabove) and does not dampen the US transmission, determined as described herein (see, for example, Example 21 hereinbelow).

The sonic energy is applied to the compressed foodstuff at a frequency that ranges from 20 kHz to 100 kHz, and a power that ranges from 1 watts per cm$^2$ to 100 watts per cm$^2$, however, other values of sonic energy are contemplated within the scope of the present invention. Also contemplated for use in fusing the foodstuff ingredients into an edible object is sonic energy of lower power, between 5 kHz to 20 kHz. In some embodiments, the sonic energy is applied to the compressed foodstuff for 0.5 sec to 10 sec, or from 1 to 5 seconds, or from 1-2 seconds, depending on the US energization capacity of the welding device, and to some extent on the nature of the mixture.

As demonstrated in the Examples section, the compression and sonic energy does not heat the mixture throughout the process to more than 90° C. In fact, the process can be carried out effectively while heating the mixture to less than 90° C., 80° C., 70° C., 60° C., or less than 50° C.

As a result of the sonic energy delivered under compression, the individual foodstuff ingredients become fused into a monolithic object that can be removed from the mold, ready to be consumed, and/or be further dried, and/or further processed to add coating, reshaping and/or wrapping.

Thus, in some embodiments, the process further includes a step of drying the resulting sonically welded snack bar to a desired humidity level having a desired water activity. The drying may be an active drying step using elevated temperatures, using any known food drying means known in the art, preferably below 100° C.

As soon as the compressed foodstuff has been welded by the sonic energy and optionally dried, it is ready for use, as no further processing is required. Nonetheless, additional steps of reshaping, coating and wrapping may be needed in order to prepare the snack bar to be marketed as a commercial product. Hence, in some embodiments of the present invention, the process further includes optionally a step of cutting the resulting sonically welded foodstuff mixture into smaller snack bars of any desired shape and size.

Welding Water Activity:

Water is needed to transfer the US energy in the compressed mixture. Water may also take a part in the fusion reactions between the ingredients in the mixture. The amount of water that is required for the process presented herein, is determined by achieving a desired "welding water activity".

According to some embodiments of the present invention, the welding water activity of the loose mixture of foodstuff ingredients, prior to effecting the process of forming the snack bar, preferably ranges from 0.7 to 0.4, or from 0.7 to 0.5, or from 0.65 to 0.55, or from 0.6 to 0.55, or from 0.50 to 0.65. Preferably, according to some embodiments of the present invention, the water activity of the loose mixture of foodstuff ingredients, shortly prior to effecting the process of forming the snack bar, ranges from 0.65 to 0.55 partial water vapor pressure.

According to some embodiments of the present invention, the process may further include adding water to the loose mixture of foodstuff ingredients. As discussed and can be seen in Example 20 hereinbelow, water is preferably added shortly before the US welding process is about to take place, and the mixture is mixed to distribute the water evenly on and between the pieces to be welded together, whereas the advantageous measure for the preferable wetness is by measuring water activity rather than water contents.

It is noted herein that water is not the only medium in which US can travel effectively, and in the context of the present invention, water is given as an exemplary medium for effecting the US welding between foodstuff ingredients; however, it is contemplated within the scope of the present invention to use other liquids. In general, the medium that facilitated the US welding process may be selected under the following criteria: edible, non-binding (as in "a binder"), chemically-compatible with the foodstuff ingredients, industrially acceptable, and machine-compatible. In some embodiments of the present invention, wine, milk, vinegar, diluted alcohol and other aqueous media may take the place of water. Thus, in some embodiments, the water is replaceable with any one of wine, beer, tea, coffee, milk, vinegar, diluted alcohol, soup, other edible aqueous solutions, and any combination thereof.

With respect to the addition of water shortly before preparing the snack bar, according to embodiments of the present invention; by "shortly", it is meant that a certain level of water activity ($a_w$) is required for the process to be effective (i.e., welding water activity), and the time period between mixing and compressing/welding should be shorter than the time the water can be absorbed by the ingredients or simple evaporate. This time period depends on the type of ingredients and the ambient conditions, however, measuring and adjusting $a_w$ to the appropriate welding water activity is rather simple and rapid, and can be done as part of the preparation for the process. Measuring of welding water activity is carried without crushing the different ingredients before the measurement so as to allow the measurement of the available partial water pressure for the welding process.

Snack Bar Manufacturing Machine:

According to some embodiments of an aspect of the present invention, there is provided a device for preparing the snack bar provided herein, which includes a compression piston, a compression chamber (mold), and a sonic energy generator/transducer for delivering sonic energy into the compression chamber.

In some embodiments, the mold is a single-face open mold, namely a "box" with one face open to allow a piston/plunger to enter the mold to compress/weld the mixture place therein.

According to some embodiments of the present invention, due to the specific process parameters, the mold can be configured to compress a mixture into a single solid snack bar having an area of 15-30 $cm^2$ and a height of 0.5-5 cm. It is noted herein that while the art teaches some compressed and sonicated food items, none is capable of manufacturing a snack bar in these dimensions while substantially maintaining the nutritional value of the foodstuff ingredients and arrive at a snack bar with acceptable mechanical properties as disclosed herein.

FIG. 1 presents a schematic illustration of an exemplary device for preparing a snack bar, according to some embodiments of the present invention, wherein device 10 includes piston 11 for applying pressure on the mixture of foodstuff ingredients placed in chamber 12, which is a bar-shaped depression in anvil 13, and showing sonic energy generator/transducer 14 which is attached to US horn and plunger 15, for applying sonic energy in chamber 12 when US horn and plunger 15 is pressing on the mixture of foodstuff ingredients.

In the exemplary snack bar manufacturing machine shown in FIG. 1, the US horn act as a compression device that effects $F_1$ and $F_2$, as well as an US welding device, acting as the press and horn simultaneously, whereas the US energy is not applied wile applying $F_1$.

In some embodiments, $F_1$ is applied in one station and $F_2$ in another station in a moving assembly line production configuration. The moving assembly line, where the mold is moved from one station to another, is more time efficient, and allows multiple snack bars to be processed in parallel while saving room and machinery elements. In addition, since $F_1$ is greater than $F_2$, and $F_2$ is applied in conjunction to applying US energy, the two station are sufficiently different to warrant separate compression devices operating at different yet constant setting throughout the production period.

The device, according to some embodiments of the present invention, may further include means for reshaping the resulting snack bar, such as a knife or a guillotine, a miter box and the likes. In some embodiments, the mold serves also a miter box.

The device, according to some embodiments of the present invention, may further include means for wrapping the snack bar. In some embodiments, the sonic energy is used to weld the wrapping material and thereby seal the snack bar inside the wrapping material, done in-line with the snack bar preparation process.

It is expected that during the life of a patent maturing from this application many relevant binder-free snack bars will be developed and the scope of the term binder-free snack bar is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

When applied to an original property, or a desired property, or an afforded property of an object or a composition, the term "substantially maintaining", as used herein, means that the property has not change by more than 20%, 10% or more than 5% in the processed object or composition.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

Foodstuff Ingredients Recipe 1

A proof of concept of some embodiments of the present invention was carried out by preparing a snack bar comprising vegetables, seeds, fruits and nuts, in whole or identifiable bits form, unless stated otherwise. Table 1 below presents the ingredients and their relative contents in percent by weight of the total weight of the composition (the snack bar). All ingredients were uncooked and dried to water activity ($a_w$) of less than 0.65 by conventional methods known in the art, and used as they would have been used as RTE snacks.

TABLE 1

| Ingredient | Percentage |
|---|---|
| Raw pumpkin seeds | 19.6% |
| Dried carrot | 18.7% |
| Raisins | 17.8% |
| Raw almonds | 16.0% |
| Raw sunflower seeds | 14.6% |
| Strawberry powder | 5.4% |
| Banana powder | 5.4% |
| Water | 2.5% |

The ingredients were mixed together, and 50 grams of the mixture were placed is a pressing chamber (110 mm×30 mm×45 mm), and subjected to a pressure of 400 bars. Thereafter, ultrasonic energy was transmitted into the chamber containing the pressed mixture for 3-4 seconds while pressing, using a transducer with a frequency of 28 kilohertz and 100 W output located on the pressing piston.

Dimensions of the mixture in the chamber prior to pressing were 110 mm×30 mm×35 mm, and after pressing 110 mm×30 mm×14 mm, characterized by a water activity ($a_w$) level of 0.5.

Example 2

Foodstuff Ingredients Recipe 2

The below is another recipe of an edible RTE snack bar, made of substantially identifiable foodstuff ingredients, devoid of a sugary binder, or any other type of binder, produced by applying pressure and ultrasonic energy.

TABLE 2

| Ingredient | Percentage |
|---|---|
| Raw pecan nuts | 17.1% |
| Raisins | 13.7% |
| Dried beetroot | 13.7% |
| Raw pumpkin seeds | 10.3% |
| Raw sunflower seeds | 10.3% |
| Dried mulberry | 8.6% |
| Coconut Flakes | 5.1% |
| Blueberry powder | 5.1% |
| Orange powder | 5.1% |
| Dates | 4.7% |
| Sesame seeds | 3.4% |
| Water | 2.9% |

Example 3

Foodstuff Ingredients Recipe 3

The below is another recipe of an edible RTE snack bar, made of substantially identifiable foodstuff ingredients, devoid of a sugary binder, or any other type of binder, produced by applying pressure and ultrasonic energy.

TABLE 3

| Ingredient | Percentage |
|---|---|
| Raw cashew nuts | 20.9% |
| Raisins | 15.7% |
| Dried apricot | 26.1% |
| Raw almonds | 26.1% |
| Pumpkin Fiber | 7.7% |
| Water | 3.5% |

Example 4

Foodstuff Ingredients Recipe 4

The below is another recipe of an edible RTE snack bar, made of substantially identifiable foodstuff ingredients, devoid of a sugary binder, or any other type of binder, produced by applying pressure and ultrasonic energy.

TABLE 4

| Ingredient | Percentage |
|---|---|
| Raw cashew nuts | 15.8% |
| Raw sunflower seeds | 14.4% |
| Raisins | 17.5% |
| Dried carrot | 18.4% |
| Raw pumpkin seeds | 19.3% |
| Strawberry powder | 12.3% |
| Water | 2.5% |

Example 5

Foodstuff Ingredients Recipe 5

The below is another recipe of an edible RTE snack bar, made of substantially identifiable foodstuff ingredients, devoid of a sugary binder, or any other type of binder, produced by applying pressure and ultrasonic energy.

TABLE 5

| Ingredient | Percentage |
|---|---|
| Raw sunflower seeds | 14.1% |
| Raw Almonds | 15.5% |
| Raisins | 17.2% |
| Dried Carrot | 18.1% |
| Raw Pumpkin seeds | 18.9% |
| Pineapple powder | 6.9% |
| Strawberry powder | 6.9% |
| Water | 2.4% |

Example 6

Foodstuff Ingredients Recipe 6

The below is another recipe of an edible RTE snack bar, made of substantially identifiable foodstuff ingredients, devoid of a sugary binder, or any other type of binder, produced by applying pressure and ultrasonic energy.

TABLE 6

| Ingredient | Percentage |
|---|---|
| Raw sunflower seeds | 14.6% |
| Raw Almonds | 16.0% |
| Raisins | 17.8% |
| Dried Carrot | 18.7% |
| Raw Pumpkin seeds | 19.6% |
| Banana powder | 5.4% |
| Strawberry powder | 5.4% |
| Water | 2.5% |

Example 7

Foodstuff Ingredients Recipe 7

The below is another recipe of an edible RTE snack bar, made of substantially identifiable foodstuff ingredients, devoid of a sugary binder, or any other type of binder, produced by applying pressure and ultrasonic energy.

TABLE 7

| Ingredient | Percentage |
|---|---|
| Raw Sunflower seeds | 14.6% |
| Raw Almonds | 16.0% |
| Raisins | 17.8% |
| Dried Carrot | 18.7% |
| Raw Pumpkin seeds | 19.6% |
| Pumpkin fibers | 5.4% |
| Strawberry powder | 5.4% |
| Water | 2.5% |

Example 8

Foodstuff Ingredients Recipe 8

The below is another recipe of an edible RTE snack bar, made of substantially identifiable foodstuff ingredients, devoid of a sugary binder, or any other type of binder, produced by applying pressure and ultrasonic energy.

TABLE 8

| Ingredient | Percentage |
|---|---|
| Raw Almonds | 14.2% |
| Raw Sunflower seeds | 14.2% |
| Raisins | 17.7% |
| Dried Carrot | 17.7% |
| Raw Pumpkin seeds | 19.5% |
| Sesame seeds | 3.6% |
| Carrot powder | 5.3% |
| Pineapple powder | 5.3% |
| Water | 2.5% |

Example 9

Foodstuff Ingredients Recipe 9

The below is another recipe of an edible RTE snack bar, made of substantially identifiable foodstuff ingredients, devoid of a sugary binder, or any other type of binder, produced by applying pressure and ultrasonic energy.

TABLE 9

| Ingredient | Percentage |
|---|---|
| Raw Almonds | 13.9% |
| Raw Sunflower seeds | 13.9% |
| Raisins | 17.4% |
| Dried Carrot | 17.4% |
| Raw Pumpkin seeds | 19.2% |
| Sesame seeds | 3.5% |
| Carrot powder | 5.2% |
| Pineapple powder | 5.2% |
| Sugar | 1.7% |
| Water | 2.4% |

Example 10

Foodstuff Ingredients Recipe 10

The below is another recipe of an edible RTE snack bar, made of substantially identifiable foodstuff ingredients, devoid of a sugary binder, or any other type of binder, produced by applying pressure and ultrasonic energy.

TABLE 10

| Ingredient | Percentage |
|---|---|
| Raw Almonds | 11.0% |
| Raw Sunflower seeds | 11.0% |
| Raisins | 25.6% |
| Dried Carrot | 18.3% |
| Raw Pumpkin seeds | 14.6% |
| Sesame seeds | 3.7% |
| Carrot powder | 5.5% |
| Pineapple powder | 5.5% |
| Sugar | 1.8% |
| Water | 3.1% |

Example 11

Foodstuff Ingredients Recipe 11

The below is another recipe of an edible RTE snack bar, made of substantially identifiable foodstuff ingredients, devoid of a sugary binder, or any other type of binder, produced by applying pressure and ultrasonic energy.

TABLE 11

| Ingredient | Percentage |
|---|---|
| Raw Almonds | 12.4% |
| Raw Sunflower seeds | 12.4% |
| Raisins | 18.6% |
| Dried Apricot | 7.7% |
| Dried Carrot | 18.6% |
| Raw Pumpkin seeds | 15.5% |
| Sesame seeds | 3.1% |
| Carrot powder | 4.6% |
| Pineapple powder | 4.6% |
| Water | 2.6% |

Example 12

Foodstuff Ingredients Recipe 12

The below is another recipe of an edible RTE snack bar, made of substantially identifiable foodstuff ingredients, devoid of a sugary binder, or any other type of binder, produced by applying pressure and ultrasonic energy.

TABLE 12

| Ingredient | Percentage |
|---|---|
| Raw Pumpkin seeds | 12.2% |
| Raw Sunflower seeds | 12.2% |
| Raw Pecan nuts | 16.7% |
| Sesame seeds | 3.0% |
| Dried Strawberry | 9.1% |
| Raisins | 15.2% |
| Dried Beetroot | 15.2% |
| Coconut Flakes | 4.6% |
| Blueberry powder | 4.6% |
| Orange powder | 4.6% |
| Water | 2.3% |

Example 13

Foodstuff Ingredients Recipe 13

The below is another recipe of an edible RTE snack bar, made of substantially identifiable foodstuff ingredients, devoid of a sugary binder, or any other type of binder, produced by applying pressure and ultrasonic energy.

TABLE 13

| Ingredient | Percentage |
|---|---|
| Raw Pumpkin seeds | 10.3% |
| Raw Sunflower seeds | 10.3% |
| Raw Pecan nuts | 17.1% |
| Sesame seeds | 3.4% |
| Dried Strawberry | 8.6% |
| Raisins | 13.7% |
| Dried Beetroot | 13.7% |
| Coconut Flakes | 5.1% |
| Blueberry powder | 5.1% |
| Orange powder | 5.1% |
| Water | 2.9% |
| Dates | 4.7% |

Example 14

Foodstuff Ingredients Recipe 14

The below is another recipe of an edible RTE snack bar, made of substantially identifiable foodstuff ingredients, devoid of a sugary binder, or any other type of binder, produced by applying pressure and ultrasonic energy.

TABLE 14

| Ingredient | Percentage |
|---|---|
| Raw Sunflower seeds | 13.9% |
| Raw Almonds | 15.2% |
| Raisins | 16.9% |
| Dried Carrot | 17.8% |
| Raw Pumpkin seeds | 15.2% |
| Pineapple powder | 5.1% |
| Strawberry powder | 5.1% |
| Dates | 4.7% |
| Sesame seeds | 3.4% |
| Water | 2.9% |

Example 15

Binder-Dissolution Assay

In order to demonstrate that the snack bar provided herein is binder-free, and to evaluate the presence of a binder or the lack thereof, the following experiment was conducted.

A box-shaped piece of a snack bar, prepared from the recipe presented in Examples 2 and 14, weighing 33 grams, was immersed in a beaker containing 150 ml distilled water, which were pre-heated to 60° C. The water was agitated for 2.5 minutes, and a sample of 5 ml was removed and tested for Brix percentage using an ATAGO® PAL-$\alpha$ refractometer.

The same test procedure was conducted using snack bars of similar contents of ingredients made by two of the leading brands in the market of snack bars, ENERGY BAR® with almonds and walnuts by STRAUSS LTD, "MAPLE GLAZED PECAN AND SEA SALT" by KIND®, and ALMOND CRUNCH by NATURE VALLEY®.

The results in Brix® were as follows:

Snack bar by STRAUSS: 5.4

Snack bar by NATURE VALLEY: 3.1

Snack bar by KIND: 3.4

Snack bars according to the present invention: 0.9

As can be seen in the results presented hereinabove, the commercially available snack bars, held together with a sugary/polyol binders, raised the Brix® reading of the water by at least 3% and up to more than 5%, while a snack bar, according to some embodiments of the present invention, raised the Brix® reading of the water by less than 1%.

This experiment demonstrates the concept of preparing a snack bar comprising the typical ingredients of known/similar snack bars, except for the fact that the presently provided snack bars are made without adding any sort of binder to the composition, thereby refraining from adding calories and processed ingredients to the all-natural foodstuff.

The water-immersed samples were left to steep in the warm water for a few more minutes, and the integrity of the bars was evaluated visually. The snack bars of the commercial brands started to disintegrate, losing small bits to the surrounding water, while the snack bars, according to embodiments of the present invention withheld their shape and integrity for the duration of the experiment, without losing bits or shape.

Example 16

Ultrasound Welding Visualization

The compression is effected by any suitable mechanical mean of applying pressure to solid matter, preferably placed in a mold, and preferably pressed with a flat-tipped piston to deliver the pressure homogeneously across the mold and evenly to the entire mixture. The process of preparing the snack bar, according to embodiments of the present invention, was inspected by visible light high-speed camera and IR camera. The mixtures as presented in Examples 2 and 14 were compressed by about 20-60 K Newton before subjecting the compressed mixtures to ultrasonic energy, and the compression/ultrasonic chamber was monitored by the two cameras throughout the procedure.

Both the high-speed camera (Olympus i-SPEED 3) and the IR camera (Optris PI 450) were used successfully in the compression/ultrasonic energy chamber. It could be seen that the fruits and nuts are pushed together by the ultrasonic and pressure energy and how moisture become visible during the process. The IR images indicated that the temperatures within the chamber did not rise above 60° C., while the temperature distribution was very heterogeneous. It could not be shown that with more force in the actuator unit, pre-pressing can be dispensed with; however it could be shown how easy it is to cut the bars with a knife. The same applies to tight packaging of the ingredients by means of ultrasonic energy.

Example 17

Hardness Test Comparison with Commercial Products

In the context of embodiments of the present invention, the pressure is applied such that the foodstuff ingredients will not heat the foodstuff over about 60° C., but will compress to form tight contacts therebetween, increasing the area of contact, and thereby allowing the sonic energy to travel through the entire volume of the foodstuff mixture more effectively, leading to more effective welding thereof.

The mechanical properties of the snack bar provided herein, was tested and compared to a commercially available snack bar prepared by conventional methods, while claiming to contain minimal amounts of added sugar.

The following foodstuff mixtures were used:

Recipe A

| Ingredient | Percentage |
|---|---|
| Raw Pecan nuts | 17.1% |
| Raisins | 13.7% |
| Dried Beetroot | 13.7% |
| Raw Pumpkin seeds | 10.3% |
| Raw Sunflower seeds | 10.3% |
| Dried Mulberry | 8.6% |
| Coconut Flakes | 5.1% |
| Blueberry powder | 5.1% |
| Orange powder | 5.1% |
| Dates | 4.7% |
| Sesame seeds | 3.4% |
| Water | 2.9% |

Recipe B

| Ingredient | Percentage |
|---|---|
| Dried Carrot | 17.8% |
| Raisins | 16.9% |
| Raw Almonds | 15.2% |
| Raw Pumpkin seeds | 15.2% |
| Raw Sunflower seeds | 13.9% |
| Pineapple powder | 5.1% |
| Strawberry powder | 5.1% |
| Dates | 4.7% |
| Sesame seeds | 3.4% |
| Water | 2.9% |

Eighty grams of the foodstuff mixtures, Recipe A and Recipe B, were placed in a pressing chamber that measures 9.3×6.7 cm. The mixtures were pressed by a pressing piston (70 mm in diameter) that fitted into the pressing chamber using a hydraulic pump. The pressing pressure was set at 150 bars.

Thereafter the pressed bars were transferred to the ultrasonic energy generation and emission machine that was fitted with a pressing unit that emits ultrasonic energy. The ultrasonic energy machine main parameters were set to:

Trigger force=1000 N;

Hold before US=1 second;

Hold force=1350 N;

Hold time=1 second; and

Ultrasonic energy amplitude=35.9 microns, which resulted in an approximated energy output of about 3500 watts that were transferred to the pre-compressed foodstuff. These compressed and subsequently sonicated snack bars, prepared according to some embodiments of the present invention, were used for the comparative mechanical properties tested that follows.

The term "trigger force" refers to the force detected by the welding machine prior to generating the US energy, and is a standard feature in US welding.

Pressures applied and forces can be presented as follows:

First compression force ($F_1$) is applied as hydraulic pressure of 150 bars on a piston of 70 mm in diameter, which results in force according to radius=ø/2, area $A=\pi\cdot r^2=\pi\cdot(ø/2)^2$, $F=P\cdot A=P\cdot\pi\cdot(ø/2)^2$, wherein F=Force, P=Pressure, and since 1 Bar is about 1 atm (0.987 atm), it can be rounded for the sake of calculation to be 1 Kg/$cm^2$.

| | | |
|---|---|---|
| Piston diameter | 70 | mm |
| Hydraulic pressure | 150 | BAR |
| Pressure applied in KG | 5250 | Kg |
| Pressure applied in N | 51450 | Newton |
| Pressure area | 62.31 | $cm^2$ |
| Compression force applied | 84.3 | Kg/$cm^2$ |
| Expressed in N/$cm^2$ | 825.7 | N/$cm^2$ |

Thus, the first compression force ($F_1$) was 825 N/$cm^2$, and the second compression force ($F_2$) was 21.7 N/$cm^2$.

Two KIND MINIS® snack bar products were selected as snack bars prepared by known processes, commercially available from KIND LLC, USA:

"Caramel Almonds & Sea Salt" KIND MINIS (KIND Almonds)—Ingredients: almonds, chicory root fiber, honey, glucose syrup, palm kernel oil, sugar, rice flour, nonfat milk powder, sea salt, carob powder, soy lecithin, natural flavor, annatto;

"Dark Chocolate Nuts & Sea Salt" KIND MINIS (KIND Nuts)—Ingredients: almonds, peanuts, chicory root fiber, honey, palm kernel oil, sugar, glucose syrup, rice flour, unsweetened chocolate, alkalized cocoa, sea salt, soy lecithin, natural flavor, cocoa butter.

Water activity ($a_w$) of all four snack bars was measured using AquaLab model Series 3Te, and the results which were obtained were:

Kind Dark chocolate: 0.549;
Kind Caramel almonds: 0.578;
Recipe A: 0.644; and
Recipe B: 0.573.

The $a_w$ results demonstrate that the water activity range is similar in both preparation technologies.

The texture of the snack bars was measured using TA HD Plus texture analyzer, commercially available from Stable Micro Systems (Surrey, UK), and a P160C probe.

The test protocol included:

Sequence: Return to Start (Set Dist)
Test Mode: Compression
Pre-Test Speed: 2.00 mm/sec
Test Speed: 1.00 mm/sec
Post-Test Speed: 1.00 mm/sec
T.A. Variable No: 5: 0.0 g
Target Mode: Distance
Distance: 9.000 mm
Strain: 10.0%
Trigger Type: Auto (Force)
Trigger Force: 10.0 g Table 15 summarize the average results obtained from a series of experiments measuring the penetration force needed to penetrate the snack bar at different locations, given in grams.

TABLE 15

| Sample | Average result in grams |
|---|---|
| Recipe A | 3050 |
| Recipe B | 3200 |
| KIND ® Almonds | 5400 |
| KIND ® Nuts | 4000 |

As can be seen in Table 15, the snack bars according to some embodiments of the present invention, prepared by the process provided herein, were more brittle than the sugar-bound KIND® snack bars, probably due to the presence of hard sugary binder in the KIND® snack bars, and also due to the difference in the ingredient and their distribution in the bar. Nonetheless, snack bars provided herein, according to some embodiments of the present invention, exhibited an acceptable texture, making them suitable for the snack bar market.

Example 18

First and Second Compression Force Limits

Preferably, the pressure applied to the foodstuff does not exceed a certain level, above which the foodstuff is affected, adversely or not, in such ways that alters its nutritional value. For example, in a foodstuff mixture comprising nuts and seeds, applying too high of a pressure would result in extracting oils from the ingredients, which has a great effect on the nutritional value thereof. In another example, applying too high of a pressure would result in excessive heat that would render the foodstuff partially or fully cooked. In another example, applying too high of a pressure would result in over heated foodstuff (e.g., overcooked, burnt, singed and/or scorched) which may lead to denaturation, formation of toxic unhealthy compounds and/or cause undesirable flavor, texture and other adverse palatability effects. If it therefore advantageous to monitor the parameters of the compression and run preparatory tests prior to the process for a given mixture prior to the manufacturing process.

The process disclosed herein includes applying a first compression force ($F_1$), followed by applying US energy under a second compression force ($F_2$) to a loose mixture of foodstuff ingredients. According to embodiments of the present invention, it is advantageous to apply $F_1>F_2$, and select $F_2$ to a force that does not dampen the US energy from traveling though the sample as it fuses.

In order to determine the criteria by which $F_1$ and $F_2$ are selected and applied, an exemplary mixture, presented in Table 16 below, was pressed under various pressure forces, and the resulting snack bars were analyzed for strength using a standard TPA test.

TABLE 16

| Foodstuff | Wt % |
|---|---|
| Raisins | 7.14% |
| Sunflower Seeds | 14.29% |
| dry tomato | 2.86% |
| Jala mix | 14.29% |
| dry Mango pieces | 14.29% |
| Pistachio | 14.29% |
| cashew | 14.29% |
| Pecans | 4.29% |
| Almonds | 5.71% |
| Corn fiber | 5.71% |
| Banana powder | 2.86% |

1 Kg of ingredients in Table 16 were mixed with 14 gr of water for 10 minutes to obtain a loose mix of foodstuff ingredients without any apparent powder.

The water activity ($a_w$) just after mixing the ingredients with water was 0.645, and after additional 15 minutes $a_w$ dropped to 0.55. Moisture level was 11.51%.

80 gr of the mixture were loaded to a pressing chamber with measurements of 93 mm by 68 mm. The mixture was pressed with hydraulic press (Lya, Israel) equipped with digital controller, with force $F_1$ measured in Kg at the pick point of the pressing process.

Thereafter the pressed sample was transferred to an ultrasonic welder (Dialog welder by Herrman, Germany), and the compressed sample was welded under $F_2$ for 2 seconds, using US frequency of 20 Khz and nominal amplitude of 33.3 microns.

In some experiments, the compression force applied during the US energization, namely $F_2$, was delivered in steps of increasing intensity, with 0.5 sec between 2 steps and 0.35 sec between 3 steps, whereas $F_{2/1}$ refers to the first pressure step, $F_{2/2}$ refers to the second step, and so on.

The hardness of the obtained snack bars was measured as a mean to evaluate the welding efficiency as a function of $F_1$, $F_2$, using a Stable Micro Systems texture analyzer model TA/TX plus, to conduct a TPA procedure with a 25 mm radius plastic probe. Briefly, the TPA setting included a 3 mm penetration, a probe size of 25 mm in a cylinder lap Perspex, test speed 5 mm per sec, and the target mode was distance.

$F_2$ was limited to a force of 2100 N in order to avoid US energy damping due to horn stifling.

The parameters that were followed included the hydraulic pressure $F_1$ applied before $F_2$ and US welding, $F_2$ (pressure during US welding). A second series of welding experiments was conducted to study the effect of $F_1$, $F_2$ on the texture of the bars, and the results, as expressed in the TPA test procedure, are presented in Table 17.

TABLE 17

| Test no. | $F_1$ (Kg) | $F_{2/1}$ (N) | $F_{2/2}$ (N) | $F_{2/3}$ (N) | TPA hardness |
|---|---|---|---|---|---|
| 1 | 1800 | 2100 | — | — | 15140 |
| 2 | 200 | 2100 | — | — | 3092 |
| 3 | 1800 | 800 | — | — | 14426 |
| 4 | 1800 | 800 | 1800 | — | 21600 |
| 5 | 1800 | 800 | 1500 | 1800 | 26887 |

As can be seen in Table 17, a low $F_1$ (Test No. 2; $F_1$=200 Kg) results in a poorly welded snack bar, even when applying $F_2$ at maximal force (2100 N), demonstrating the requirement of a sufficiently tightly packed sample prior to applying US energy into the sample. Interestingly, when $F_1$ is sufficiently high, the intensity of $F_2$ applied in a single compression (Test Nos. 1 and 3; 800 N or 2100 N) has a small effect on the hardness of the resulting snack bar.

As can be seen in Table 17, Test Nos. 3-5, when $F_2$ increases stepwise during the US energization, the strongest snack bar was afforded, which is a favorable result. More specifically, two $F_2$ steps resulted in a better result than a single $F_2$ step, and three $F_2$ steps resulted in an even harder snack bar.

These studies show that a first compression step is critical to compact the loose mixture tightly to allow the US vibrational energy to penetrate deep and throughout the snack bar, which is rather large, compared to products welded by compression and US known in the art (see, for example, Test No. 4 compared to Test No. 3).

Example 19

Oil-Pressing Force

The process disclosed herein includes applying a first compression force ($F_1$) before applying US energy, under a second compression force ($F_2$) to snack bar into effect welding of the foodstuff ingredients. In some embodiments of the invention, it is advantageous to apply $F_1$ to a force that does not cause oil to secrete from the ingredients in the mixture.

In order to determine the maximal force for $F_1$, referred to herein as an oil-pressing force, an exemplary mixture, presented in Table 16 above, was pressed at an increasingly growing force and the force-point of measurable oil extraction was recorded.

1 Kg of ingredients in Table 16 were mixed with 14 gr of water for 10 minutes to obtain a loose mix of foodstuff ingredients without any apparent powder.

A dose of 80 gr of the mixture was loaded to a pressing chamber with dimensions of 68 mm by 93 mm. A standard absorption lab paper (Whatman® quantitative filter paper, ashless, Grade 41) was cut to the pressing chamber dimensions and was placed under and above the dose during pressure, so as to allow secreted oils to be weighted and quantified.

The preparation was pressed at several levels of force by a hydraulic press equipped with digital control (Lya, Israel). Once pressed, the preparation was removed from the pressing chamber and weighted in order to quantify the amount of oil secreted during press. The results of the oil-pressing force, obtained for the given mixture are presented in Table 18 below.

TABLE 18

| Force (Kg) | Pressure (Kg per $cm^2$) | Oil secreted (gr) | As percentage of preparation | Remarks |
|---|---|---|---|---|
| 0 | 0.00 | 0.1 | 0.13% | |
| 200 | 3.16 | 0.2 | 0.25% | |
| 600 | 9.49 | 0.3 | 0.38% | |
| 1000 | 15.81 | 0.6 | 0.75% | |
| 1800 | 28.46 | 1.1 | 1.38% | Stained paper |
| 3000 | 47.44 | 2.2 | 2.75% | Visible oil |

As can be seen in Table 18, at a compression force of about 470 N/$cm^2$ (3000 Kg exerted to the sample in this example), oil is visibly pressed out of the mixture, and it is at the discretion of the user to fine-tune the compression to an optimal value between 1800 and 3000 Kg. Thus, the assay allows the user to follow the response of any given mixture to pressure, and determine the force at which oil does not pressed out substantially from the mixture of foodstuff ingredients.

Example 20

Water Activity Limit

The process provided herewith requires the addition of wetness to the loose mixture of foodstuff ingredients. The wetness, referred to herein as water activity ($a_w$), as oppose to moisture, is a non-equilibrium property of the mixture, which is the context of embodiments of the present invention, refers to the water available for the welding process on the surface of the particles in the mixture to be fused into a snack bar, whereas moisture is a property of the entire mixture, including the bulk of the ingredients and their surface together. Hence, water activity is the parameter that is looked at for effective welding, and not the moisture of the mixture.

The following study was conducted in order to determine the optimal water activity for welding.

The exemplary mixture, presented in Table 16 above, was pressed at an increasingly growing force and the force-point of measurable oil extraction was recorded.

1 Kg of ingredients in Table 16 were mixed with 14 gr of water for 10 minutes to obtain a loose mix of foodstuff ingredients without any apparent powder.

The wetted mixture was placed in a sealable container to maintain, and the water activity was measured using at time intervals using Aqualab water activity meter. In order to measure the available moisture for welding, the different particles were not crushed before measurement, but rather placed in the measurement plastic tube in pieces. The overall moisture level of the sample was determined using a halogen type moisture analyzer and found to be 11.5% water content.

At each of the following times intervals, 0, 15, 30, 60, 120, 180, 720 minutes, 80 grams of wetted mixture were loaded to a pressing chamber 93 mm×68 mm in size, and compressed with a hydraulic press (Lya, Israel) equipped with digital controller at a force of 1800 Kg.

Thereafter the compressed mixture was transferred to an ultrasonic welder (Dialog welder by Herrman, Germany) and welded for 1.2 seconds at a step-wise welding force: 1000 N for 0.25 sec, 1500 N for 0.35 sec and 2100 N for the rest of welding duration. US frequency was 20 Khz and nominal amplitude 33.3 microns with amplitude setting of 100%.

The obtained snack bars were cut to 25 mm by 25 mm cubes and tested for texture parameters using standard TPA test. The test was run on a Stable Micro Systems texture analyzer model TA/TX plus, using a TPA procedure with a 25 mm radius plastic probe, under the following parameters:

4 mm penetration.

Probe 25 mm DIA cylinder lap Perspex

Test speed 5 mm per sec.

Target mode—distance

The results are presented in Table 19 below. As control, Test No. was a bar prepared before the addition of any water to the mixture, following the above procedure.

TABLE 19

| Test No. | Time interval (min) | Hardness (grams) | gumminess | Chewiness | $a_W$ |
|---|---|---|---|---|---|
| 1 | 0 | 2664 | 1795 | 1412 | 0.36 |
| 2 | 0 | 25538 | 16734 | 12244 | 0.61 |
| 3 | 15 | 26193 | 16561 | 10603 | 0.61 |
| 4 | 30 | 27645 | 16804 | 11783 | 0.61 |
| 5 | 60 | 36164 | 22002 | 17038 | 0.55 |
| 6 | 120 | 23338 | 16123 | 10716 | 0.55 |
| 7 | 180 | 16023 | 7948 | 4749 | 0.52 |
| 8 | 720 | 18655 | 12916 | 7954 | 0.51 |

As can be seen in Table 19, welding was ineffective without added water, whereas good welding was obtained when $a_w$ was between 0.61 and 0.55. Correlation between measured $a_w$ and hardness was calculated at 0.83. Poor welding was observed again when $a_w$ was lower than 0.55, while moisture content remained constant, probably due to lack of available wetness on the surface of the ingredients, as the water was absorbed and no longer available for the welding process.

It was concluded that in order to obtain a well-structured snack bar with desired mechanical properties, the moisture content is not a relevant parameter, but rather the water activity, which should be measured without crushing the components just before the welding process. Welding a snack with water activity as measured without crushing the components below 0.51 results in a poorly welded snack.

Welding snack bars with water activity above 0.75 results in steam production during US welding, so as to hinder the welding process and cook the ingredients. In addition, it was noted that water activity above 0.65 renders the snack vulnerable to adverse microbiological growth.

It was concluded that adding water to the loose mixture of foodstuff ingredients is critical, and that the optimal or acceptable values of water activity value should be measured without crushing the ingredients, and shortly before the first step of the process, namely before the first compression force is applied. More specifically it was noted that water activity between 0.55 and 0.65 is preferable.

Example 21

Sonic Energy Damping Force Limit

As discussed hereinabove, $F_2$ is limited by US damping resulting from the inability of the horn to vibrate and thereby generate the US energization effectively or at all—this force limit is referred to herein as the sonic energy damping force.

In order to determine the sonic energy damping force, the following study was conducted using a commercially available welding machine by Herman Ultraschall, Germany.

The welding machine was used to press and US-energize a pre-compressed mixture of foodstuff ingredients, similar to that presented in Table 16 hereinabove, having an area of about 65 $cm^2$, and the results are presented in FIG. 6.

Figure 6A:
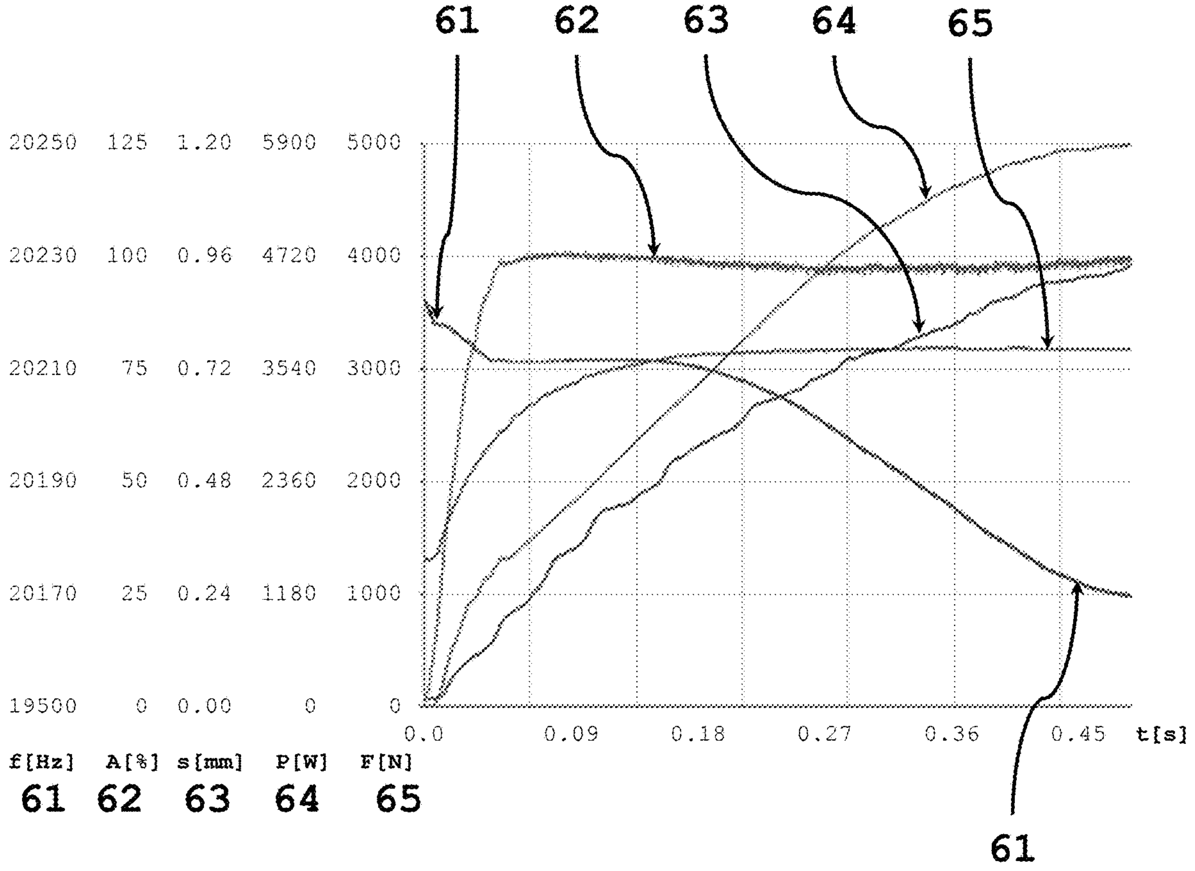
FIGS. 6A-B present comparative plots of US frequency (f[Hz]; plot 61), US amplitude (A[%];plot 62), travel (s[mm]; plot 63), US power (P[W]; plot 64), and force (F[N]; plot 65) as a function of time (t[s]), as recorded during a gradual increase of compression force on a 65 $cm^2$ snack bar sample, according to some embodiments of the present invention.
Figure 6B:
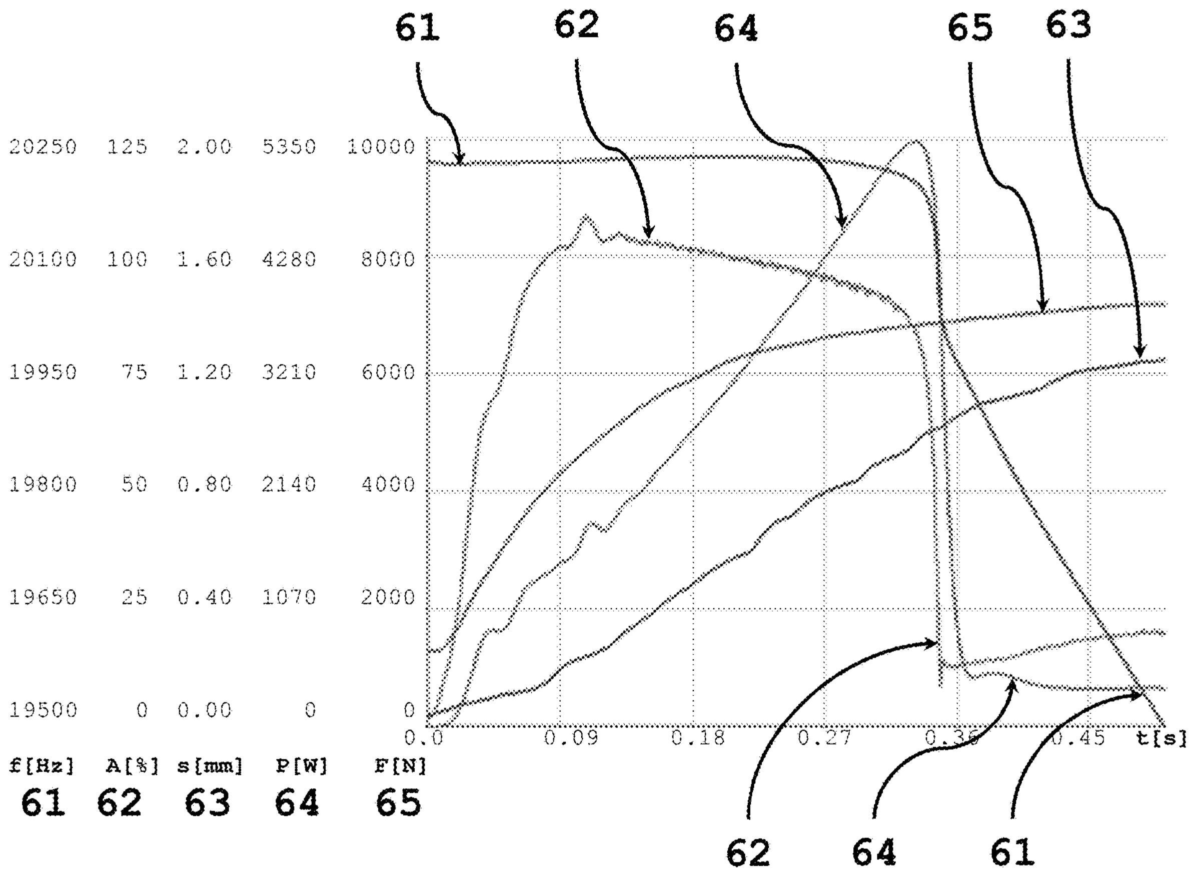

FIGS. 6A-B present comparative plots of US frequency (f[Hz]; plot 61), US amplitude (A[%];plot 62), travel (s[mm]; plot 63), US power (P[W]; plot 64), and force (F[N]; plot 65) as a function of time (t[s]), as recorded during a gradual increase of compression force on a 65 $cm^2$ snack bar sample, according to some embodiments of the present invention.

As can be seen in FIG. 6A, at a compression force of 3000 N, a notable drop in US frequency is observed accompanied by evident instability of the US amplitude, caused by the mechanical pressure exhibited by the ultrasonic horn, which dampens the ultrasonic energy generation and transmission. As can be seen in FIG. 6B, using a higher ultrasonic power and compression forces that exceed 5000 N resulted in faster damping of both frequency and amplitude that eventually lead to welding failure.

These experiments suggested that the upper limit of $F_2$ should be evaluated experimentally based on the properties of the sample and device, but the procedure and conclusions are simple and easily arrived at—the second compression force should not exceed a sonic energy damping force.

A second conclusion stemming from these experiments was that the compression $F_2$ will afford optimal results when applied gradually or in increasing steps up to the sonic energy damping force, a conclusion that was corroborated by the results presented in Example 18 (see, Table 17) hereinabove.

Example 22

Welding Water Activity

Example 20 hereinabove has shown that water activity as measured without crushing the ingredients is in good match with the snack bar's texture profile, and has shown that a measured water activity that range 0.55 to 0.65 was determined. While water activity at equilibrium greater than 0.65 may allow microbiological growth, transitional water activity may allow steam to accumulate and disrupt the welding process.

Thus, the objective of this example was to compare a snack bar produced at high water activity vs. a snack bar produced using the herein disclosed water activity. For the purpose of this example, "water activity" will refer to in partial water vapor pressure measured without crushing the ingredients in the mixture, and without reaching moisture equilibrium, but rather as a measure of water available for the welding process.

All water activity measurements were conducted using AquaLab water activity meter, and the exemplary mixture presented in Table 16 above was used for this demonstration.

Sample A (Recommended $a_w$; sample 198)

78.5 gr of the mixture were mixed with 1.5 gr of water for 5 minutes, and the measured water activity was 0.65.

The mixture was loaded to a pressing chamber with measurements of 93*68 mm, and pressed with hydraulic press (Lya, Israel) equipped with digital controller, to 2000 kg of pressure measured at the pick point of the pressing process.

The compressed mixture was transferred to an ultrasonic welder (Dialog welder by Herman, Germany) were the mixture was welded for 1.2 seconds. Welding force was set stepwise to 1000 N for the first 0.5 sec and the rest of the welding duration at 2100 N. US frequency was set to 20 Khz and the nominal amplitude to 29.9 microns (90%).

Sample B (high $a_w$; sample 199)

76 gr of the mixture were mixed with 4 gr of water for 5 minutes, and the measured water activity 0.853.

The mixture was loaded to a pressing chamber with measurements of 93*68 mm, and pressed with hydraulic press (Lya, Israel) equipped with digital controller, to 2000 kg of pressure measured at the pick point of the pressing process.

The compressed mixture was transferred to an ultrasonic welder (Dialog welder by Herrman, Germany) were the mixture was welded for 1.2 seconds. Welding force was set stepwise to 1000 N for the first 0.5 sec and the rest of the welding duration at 2100 N. US frequency was set to 20 Khz and the nominal amplitude to 29.9 microns (90%).

The obtained bars were tested for texture parameters using standard TPA test using a Stable Micro Systems texture analyzer model TA/TX plus according to a TPA procedure with a 25 mm radius plastic probe, at the testing parameters: 4 mm penetration, probe 25 mm diameter cylinder lap Perspex, test speed 5 mm per sec and the target mode was distance.

The results are presented in Table 20 below.

TABLE 20

| Sample | Hardness | aW |
|---|---|---|
| 198 | 35870 | 0.65 |
| 199 | 7506 | 0.85 |

As can be seen in Table 20, high welding water activity, as measured prior to US welding, without crushing the ingredients, is inferior in terms of texture and welding effectiveness to welding at $a_w$ of 0.65. It is assumed that welding with high water activity may create excess steam that interferes with the welding process.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

In addition, any priority document(s) of this application is/are hereby incorporated herein by reference in its/their entirety.

Example 23

Functional Differences Between a Snack Bar Prior to and after Sonication

Some functional differences exist between a sonicated snack according to invention and a similar recipe, undergoing identical treatment but without applying ultrasonic energy. More specifically, the snack is cohesive, bound together and can hold it's shape. Even more specifically, the bar has similar mouthfeel (similar "bite") to other snacks in the category, i. e. the snack is not too hard to bite and not too soft so as to retain its shape during shelf life, handling and consumption, while retaining its nutritional value.

The process disclosed herein includes applying a first compression force ($F_1$), followed by applying ultrasonic energy under a second compression force ($F_2$) to a loose mixture of foodstuff ingredients. According to embodiments of the present invention, it is advantageous to apply $F_1>F_2$, and select $F_2$ to a force that does not hamper the ability of the ultrasonic energy from traveling though the sample as it fuses.

In order to demonstrate the functional differences attributed to the ultrasound energy, an exemplary mixture, presented in Table 16 below, was pressed under specific press forces as is further detailed below, with and without sonication and the resulting snack bars were analyzed for strength using a standard TPA test.

TABLE 16

| Foodstuff | Wt % |
|---|---|
| Raisins | 7.14% |
| Sunflower Seeds | 14.29% |
| Dry tomato | 2.86% |
| Jala mix | 14.29% |
| Dry Mango pieces | 14.29% |
| Pistachio | 14.29% |
| Cashew | 14.29% |
| Pecans | 4.29% |
| Almonds | 5.71% |
| Corn fiber | 5.71% |
| Banana powder | 2.86% |

Two hundred grams of ingredients as listed in Table 16 above were mixed with 4 grams of water for 5 minutes so as to obtain a loose mix of foodstuff ingredients devoid of any apparent powder.

Eighty grams of the mixture were loaded onto a rectangular pressing chamber, measuring 93 mm by 68 mm. The mixture was pressed with a hydraulic press (Lya, Israel) equipped with a digital controller, with a force of 2,000 Kg. measured at the pick point of the pressing process. Two samples, A and B, were prepared and further handled, as follows:

Sample A: Pressed sample was transferred to an ultrasonic welder (Dialog welder by Herrman, Germany), and the compressed sample was welded for a total of 1 second with an amplitude of 29.9 microns. The forces applied during sonication were 1,000 N for 0.3 second, 1,500 N for 0.3 seconds and 2,100 N for the duration of the welding process.

Sample B: Did not undergo sonication.

The hardness of the obtained snacks was measured to serve as a mean to evaluate the added structural rigidity of the snac formed with sonication (Sample A), as compared with a snac that did not undergo sonication (Sample A). To this end, a Stable Micro Systems texture analyzer model TA/TX plus, was used to conduct a TPA procedure with a 25 mm radius plastic probe. Briefly, the TPA setting included a 3 mm penetration, a probe size of 25 mm in a cylinder lap Perspex, test speed 5 mm per second, and the target mode was distance.

Absence of sonication (press only, Sample B) results in a poorly adhered snack bar (16654.115 grams). The sonication step (Sample A) increased the adherence and hence hardness nearly two fold (28108.356 grams) and resulted in a snack bar similar, in terms of bite and structural strength, to commercially available snacks, whereas the pressed bar was very fragile when handled.

These studies show that a sonication step is critical to obtain a bite and structural strength that are sufficient for the consumption and distribution of snack bars.

It is noticed that the visual appearance of the sonicated bar is different from the pressed bar. More specifically, the sonicated snack bars surface is smoother and more uniform in terms of texture.

What is claimed is:

1. A process of preparing a ready-to-eat snack bar food product, the process comprising: applying a first compression force to a mixture of foodstuff ingredients, without applying sonic energy, while not exceeding an oil-pressing force, wherein said oil-pressing force is determined by pressing said mixture of foodstuff ingredients at an increasingly growing force and recording said oil-pressing force when oil is visibly pressed out of said mixture of foodstuff ingredients, thereby obtaining a compressed mixture; after obtaining said compressed mixture, applying sonic energy to said compressed mixture while maintaining physical contact between a sonic energy source and said compressed mixture, at a second compression force that is less than the first compression force, so as to allow said sonic energy to travel through said compressed mixture and to effect ultrasonic welding at said physical contact between said mixture of foodstuff ingredients in said compressed mixture, thereby obtaining the ready-to-eat snack bar food product.

2. The process of claim 1, wherein said mixture of foodstuff ingredients is characterized by a welding water activity that ranges from 0.55 to 0.65.

3. The process of claim 1, wherein said mixture of foodstuff ingredients are characterized by at least one property selected from the group consisting of: at least some foodstuff ingredients have not been treated by heat; and at least some foodstuff ingredients are whole foodstuff ingredients.

4. The process of claim 1, wherein said physical contact enables sonic energy transmission through said compressed mixture at no less than 80% of peak energy transfer efficiency, as measured by an energy-transfer probe.

5. The process of claim 1, wherein a power density of said sonic energy applied to said compressed mixture ranges from 1 watts per $cm^2$ to 100 watts per $cm^2$.

6. The process of claim 1, wherein said sonic energy is applied for 0.5 sec to 10 sec.

7. The process of claim 1, wherein the applying of the first compression force to said mixture of foodstuff ingredients and the applying of the sonic energy to said compressed mixture are performed in a single face open mold.

8. The process of claim 1, wherein said compressed mixture has an area of of 10-300 $cm^2$ and a height of 0.5-5 cm.

9. The process of claim 1, wherein a nutritional value and/or a water content of said mixture of foodstuff ingredients prior to the applying of the first compression force is maintained within ±10% variation compared to a nutritional value and/or a water content of the ready-to-eat snack bar food product.

10. The process of claim 1, wherein the ready-to-eat snack bar food product comprises less than 5% of an added binder.

11. The process of claim 1, wherein said mixture of foodstuff ingredients comprises at least 20 wt % dry foodstuff ingredients, said dry foodstuff ingredients comprise less than 10 wt % water.

12. The process of claim 1, wherein said mixture of foodstuff ingredients is uncooked.

13. The process of claim 1, wherein the ready-to-eat snack bar food product has an area of 10-300 $cm^2$ and a height of 0.5-5 cm.

14. The process of claim 1, wherein said mixture of foodstuff ingredients are selected from the group consisting of a nut, a cereal, a seed, a fruit, a vegetable, a dry meat, a dry dairy product, a dry confectionary product, and any combination thereof, and wherein the dry meat, the dry dairy product, and the dry confectionary product comprise less than 10 wt % water.

* * * * *